(12) United States Patent
Chevroton et al.

(10) Patent No.: US 10,525,617 B2
(45) Date of Patent: Jan. 7, 2020

(54) TOOLING DEVICE FOR MAKING A PLASTIC FILM COMPONENT

(71) Applicant: Faurecia Innenraum Systeme GmbH, Hagenbach (DE)

(72) Inventors: Vincent Chevroton, La Wantzenau (FR); Stéphan Flecher, Rountzenheim (FR); Alain Julien, Roches les Blamont (FR); Gwenael Lecolloter, Rennes (FR)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 719 days.

(21) Appl. No.: 15/192,585

(22) Filed: Jun. 24, 2016

(65) Prior Publication Data

US 2016/0375615 A1    Dec. 29, 2016

(30) Foreign Application Priority Data

Jun. 25, 2015 (DE) .................. 10 2015 008 138

(51) Int. Cl.
| | |
|---|---|
| B29C 41/22 | (2006.01) |
| B29C 43/36 | (2006.01) |
| B29C 43/04 | (2006.01) |
| B29C 43/18 | (2006.01) |
| B29C 43/34 | (2006.01) |
| B29C 43/32 | (2006.01) |

(52) U.S. Cl.
CPC .............. *B29C 43/36* (2013.01); *B29C 43/04* (2013.01); *B29C 43/18* (2013.01); *B29C 43/34* (2013.01); *B29C 2043/3222* (2013.01); *B29C 2043/3255* (2013.01); *B29C 2043/3272* (2013.01)

(58) Field of Classification Search
CPC ......... B29C 33/12; B29C 33/14; B29C 33/20; B29C 33/76; B29C 43/36
See application file for complete search history.

(56) References Cited

U.S. PATENT DOCUMENTS

| | | | | |
|---|---|---|---|---|
| 4,025,250 A | * | 5/1977 | MacMillan | ........ B29D 30/0629 425/17 |
| 5,127,818 A | | 7/1992 | Tibbetts et al. | |
| 5,676,381 A | * | 10/1997 | Buzzoni | .............. B29C 33/0038 425/435 |

OTHER PUBLICATIONS

German Office Action, in German with English translation, corresponding to DE application No. 102015008138.1, dated Feb. 17, 2016, 11 pages.

* cited by examiner

*Primary Examiner* — Joseph S Del Sole
*Assistant Examiner* — Thu Khanh T Nguyen
(74) *Attorney, Agent, or Firm* — Reising Ethington P.C.

(57) ABSTRACT

A tooling device for making a plastic film component. The tooling device includes a molding tool having a molding part, a receptacle, an opening and closing device, and at least one covering device having a covering surface and guide arrangement. The molding part and the receptacle are movable relative to each other between a closed and an open position. Relative movement between the molding part and the receptacle to the closed position is transmitted to the covering device to move it from an exposed position, in which the covering surface is spaced from an inner surface of the molding part, to a covered position, in which the covering surface covers a covered section of molding part's inner surface.

19 Claims, 11 Drawing Sheets

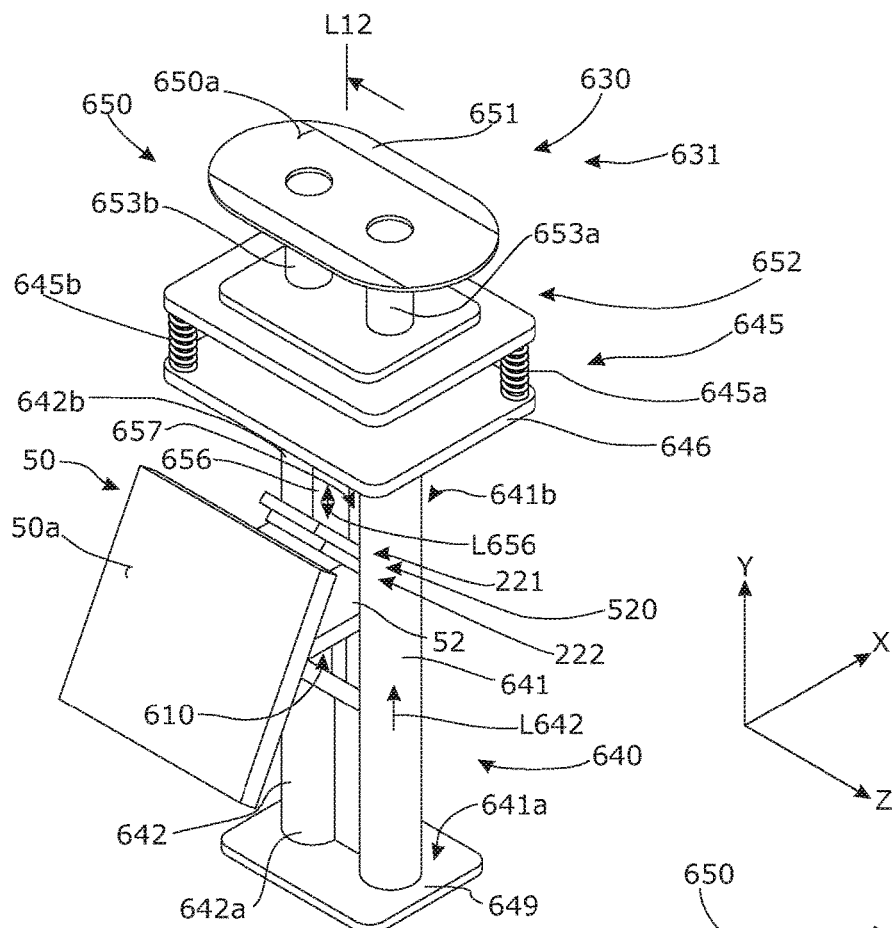
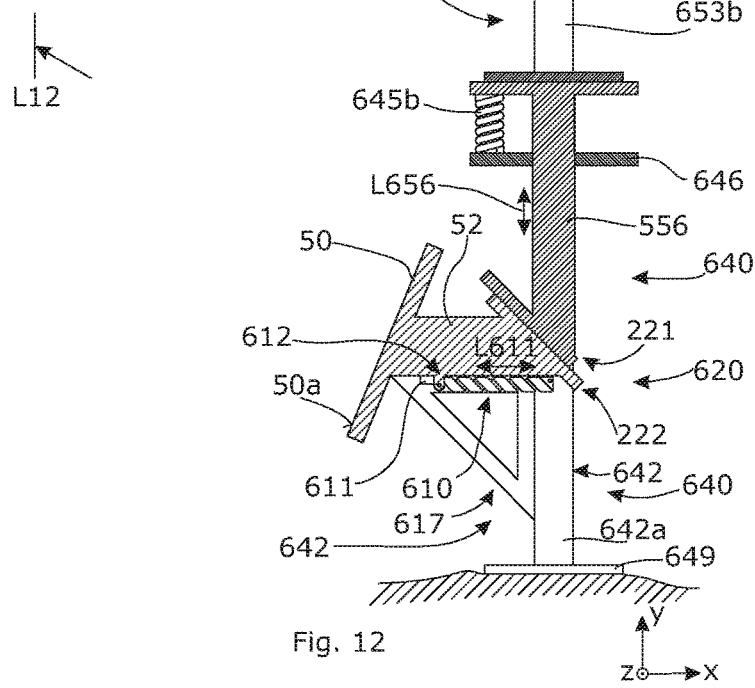
Fig. 11
Fig. 12

TOOLING DEVICE FOR MAKING A PLASTIC FILM COMPONENT

TECHNICAL FIELD

The invention relates to a tooling device for making a plastic film component.

BACKGROUND

A device for making a plastic film component is known from DE 39 30 603 C2.

SUMMARY

An object of the present invention is to provide a tooling device which offers an efficient way to make a plastic film component with an recess.

This object is solved with the features of the independent claims. Further embodiments are described in the subordinate claims referring back to the respective independent claims. According to a first aspect of the invention, a tooling device for making a plastic film component is provided, wherein the tooling device includes:

a molding tool comprising a molding part having a molding part inner surface, a receptacle and an opening and closing device, at least one covering device with a covering surface, an abutment device, a guide arrangement having a first and a second guide device, wherein the first guide device couples the covering device on one of the components (a) the receptacle or (b) the molding part as the first molding tool component for movement purposes, wherein the second guide device couples the covering device and the abutment device for movement purposes, an activation device which couples the abutment device and each of the other components (a) or (b) as a second molding tool component for movement purposes, wherein when the first and second molding tool components are moved from an open to a closed position the abutment device and the respective second molding tool component in a molding tool abutment position are brought into abutment with one another, and the first and second guide devices guide the covering surface from an exposed position, in which the covering surface is located apart from the molding part inner surface and the abutment device apart from the primary component, into a contact position with a section of the covering of the molding part inner surface.

According to one embodiment of the tooling device, it is provided that the activation device couples the abutment device with the receptacle, wherein when the molding tool is in the closed position the abutment device lies in a covered position over the molding part inner surface, wherein the abutment device is attached to a first guide component, which is coupled for motion purposes with a second guide component attached to the covering device.

According to a further embodiment of the tooling device, it is provided that the first guide device comprises a first guide component extending flat in the lengthwise direction, and the second guide component comprises a second guide component extending flat in the lengthwise direction, which two components are brought to bear on one another in the closed position thereof when the molding part and receptacle are moved, being guided alongside one another in their respective lengthwise directions, and deflecting the movement to the closed position of the molding part and the receptacle relative to each other into a movement of the covering device to the covered position.

According to a further embodiment of tooling device, alternative to the above, the second guide device is constructed according to one of the following two alternatives:

the second guide device comprises: a guide track which is attached to the covering device, and a second coupling element which is movable thereon and is attached to the abutment device, the second guide device comprises: a guide track which is attached to the abutment device and a second coupling element which is movable thereon and is attached to the abutment device.

In this embodiment of the tooling device, it may also be provided that the connecting device is connected to a third coupling element, and the third coupling element is coupled to a third guide track, which is attached to the receptacle or a support section thereof.

According to a further embodiment of tooling device, it is provided that the second guide device comprises:

a telescoping assembly, which is mounted rotatably on the first molding tool component, a first telescoping coupling, via which the telescoping assembly is coupled to the abutment for movement purposes, a second telescoping coupling, via which the telescoping assembly is coupled to the covering device for movement purposes.

According to a further embodiment of tooling device, it is provided that the tooling device comprises a biasing device, which biases the abutment device towards the molding part—in a position viewed from the receptacle.

According to a further aspect of the invention a tooling device for making a plastic film component is provided, wherein the tooling device comprises:

a molding tool comprising a molding part with a molding part inner surface, a receptacle and an opening and closing device, with which the molding part and the receptacle are movable relative to each other between a closed and an open position, at least one covering device with a covering surface and a guide arrangement with a first guide device, via which the covering device is coupled for movement purposes to one of the components (a) the receptacle or (b) the molding part, and with a second guide device, that couples the covering device to the component (a) or (b) that is not coupled for movement purposes to the first guide device, wherein the guide arrangement is able to move the covering device between a covered position, in which the covering surface covers a covered section of the molding part inner surface, and an exposed position, in which the covering surface is separated from the molding part inner surface, wherein the movement between the covered position and the exposed position is coupled mechanically to the movement of the molding part relative to the receptacle.

In this context, it is provided according to a further embodiment of the tooling device the first guide device is in the form of a first guide component mounted on the covering device and extending flat in the lengthwise direction, and die second guide device is in the form of a second guide component extending flat in the lengthwise direction, which is mounted on one of the components (a) or (b) that is not coupled for movement purposes to the first guide device, wherein the first guide component and the second guide component bear against each other when the mold part and the receptacle are in an intermediate bearing position and move alongside each other in their respective lengthwise directions as the molding part and the receptacle approach, bringing the covering device from the exposed position into the covered position.

According to a further embodiment of this aspect of the tooling device, it is provided that the second guide device is constructed according to one of the following two alternatives:

the second guide device comprises: a second guide track which is attached as a second guide component to the covering device, and a second coupling element which is movable thereon and is attached to the molding part, the second guide device comprises: a second guide track which is attached as a second guide component to the molding part, and a second coupling element which is movable thereon and is attached to the covering device.

According to a further embodiment of this aspect of the tooling device, it is provided that the second guide device comprises: a first guide component and a second guide component, which bear on each other when the molding part and receptacle more to their closed position, being moved alongside each other in their respective lengthwise directions, and at the same time deflecting the movement of the molding part and receptacle to the closed position relative to each other into a movement of the covering device to the covered position.

In this embodiment of the tooling device it may be provided that the first guide component comprises a first outer guide surface and the second guide component comprises a second guide surface, which is conformed on a bracket mounted on the molding part and arranged in an interior space S, and the first outer guide surface and the second guide component slide alongside each other on a second guide surface between the intermediate bearing position and the covered position.

Alternatively, in one embodiment of the tooling device it may be provided that the first guide component or the second guide component comprises a guide surface and other of the two guide components comprises a roller arrangement, and the guide surface and the roller arrangement slide alongside each other between the intermediate bearing position and the covered position.

According to a further embodiment of this further aspect of the tooling device, it is provided that the first guide device is constructed according to one of the two following alternatives:

the first guide device comprises: a first guide track, which is attached to the receptacle, and a first coupling element which is attached to or mounted on the covering device and is in a guide coupling with the first guide track, so that the first coupling element is movable along the first guide track;

the first guide device comprises: a first guide track, which is attached to the covering device, and a first coupling element which is attached to or mounted on the receptacle and is in a guide coupling with the first guide track, so that the first coupling element is movable along the first guide track.

In general with regard to the embodiments of the tooling device, it may be provided that the covering device comprises a base body and a covering body that is arranged movably thereon.

Moreover, it may be provided in the embodiments of the tooling device that the molding tool comprises a biasing device, with which the covering device is biased toward the base body, into the exposed position.

It may also be provided generally in the embodiments of the tooling device that the opening and closing device:

is configured as an opening and closing device the enables an opening and closing movement of the molding part relative to the receptacle with a translational movement component, or is configured as a pivot bearing device, which enables a rotating opening and closing movement of the molding part relative to the receptacle by coupling the molding part (30) and the receptacle by means of a pivot bearing device.

In this document, the expression "along", in conjunction with the specified directional information relating to the course of a contour line or surface, or relating to a direction of a mechanical component such as an axle or a shaft, may mean in particular that the course of the tangent with the respective contour line or surface according to the direction specification or lengthwise extension, and for example the centre line of the mechanical component, may differ locally by an angle not exceeding 45 degrees, preferably not exceeding 30 degrees from a reference direction or reference axis with which or to which the respective direction specification relates.

In this document, the expression "transversely", in conjunction with the specified directional information relating to the course of a contour line or surface, or relating to a direction of a mechanical component such as an axle or a shaft, may mean in particular that the course of the tangent with the respective contour line or surface according to the direction specification or lengthwise extension and for example the centre line of the mechanical component, may differ locally by an angle not less than 45 degrees and preferably not less than 60 degrees from a reference direction or reference axis with which or to which the respective direction specification relates.

In this document, the term "distance" is understood to refer in particular to the shortest distance between two surfaces.

The term "continuous course" of a surface indicates that when viewed along a reference direction the surface exhibits no corners or discernible deviations along the entire width extending transversely to the reference direction.

For the purposes of this document, a directionality or orientation of a surface, e.g., in an expression according to which a surface is aligned in or along a respectively indicated direction, means in particular that the normal of at least a section of said surface is aligned in or along the respectively indicated direction. This definition applies in particular for the local directionality of a section of the surface, that is to say the directionality of a single, local point on the surface section. The directionality or orientation of a surface section as a whole is understood in particular to mean that the orientation of the surface section has the respective directionality or orientation, in at least a central area of the respective surface section. The central area of the surface section may particularly be defined as a circular area around the centroid of the surface section, as the centre thereof, wherein the circular area occupies half the surface area of the surface section.

For the purposes of this document, the course of a surface, particularly in comparison with another component or direction, is understood to mean the direction of a tangent with a given point on the surface, wherein the direction of the tangent is defined in relation to another tangent with another point on the surface.

The lengthwise direction of a structural component, and particularly of a guide track, is calculated as a line connecting the centroids of the smallest cross sectional areas in each case. Since the structural component and in particular of a guide track is straight, or at least sections thereof may be curved, the lengthwise direction is generally understood to be a local lengthwise direction.

The term "coupled for the purposes of movement" refers to a coupling of the movements of two components with each other, and within this meaning such coupling may include direct coupling or also coupling with a gearing or transmission system between the two components.

BRIEF DESCRIPTION OF THE DRAWINGS

In the following, embodiments of the tooling device according to the invention having a molding part, a receptacle, a covering device for covering a covered section, and a first and a second guide device for moving the covering device will be described with reference to the accompanying figures, which show.

DETAILED DESCRIPTION OF THE ILLUSTRATED EMBODIMENTS

Figure 1:
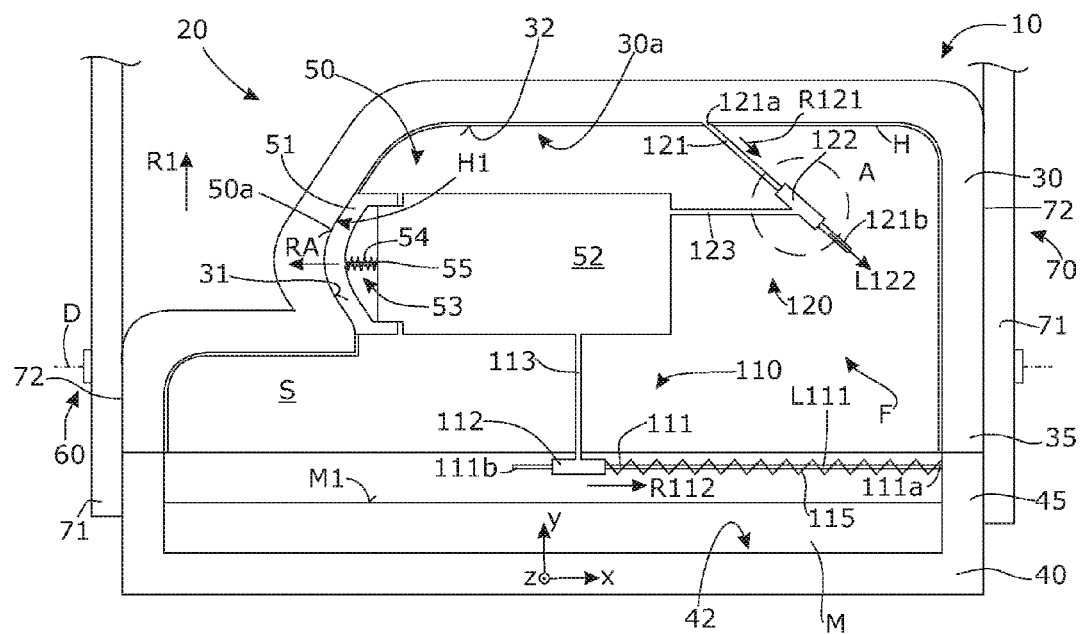
FIG. 1 a cross sectional representation of an embodiment of the tooling device according to the invention in a closed state, FIG. 2 the embodiment of the tooling device represented in FIG. 1 represented in an open state, FIG. 3 an enlarged detail of a section A of FIG. 1, FIG. 4 a cross sectional representation of a further embodiment of the tooling device according to the invention in a closed state, FIG. 5 the embodiment of the tooling device represented in cross section in FIG. 4 in an open state, FIG. 6 a cross sectional representation of a further embodiment of the tooling device according to the invention in a closed state, FIG. 7 a cross sectional representation of a further embodiment of the tooling device according to the invention in a closed state, FIG. 8 the embodiment of the tooling device represented in cross section in FIG. 7 in an open state, FIG. 9 a cross sectional representation of a further embodiment of the tooling device according to the invention in a closed state, FIG. 10 the embodiment of the tooling device represented in cross section in FIG. 9 in an open state, FIG. 11 a perspective representation of the covering device, a first guide device, the second guide device and the activation device of a further embodiment of the tooling device according to the invention, FIG. 12 a cross sectional representation of the combined components of the embodiment of the tooling device shown in FIG. 11, FIG. 13 a cross sectional representation of the covering device, a first guide component, the second guide component and an activation device of a further embodiment of the tooling device according to the invention, FIG. 14 a cross sectional representation of two covering devices, a first guide component, the second guide component and an activation device of a further embodiment of the tooling device according to the invention FIG. 15 a perspective representation of the embodiment of the tooling device represented in FIG. 14, FIG. 16 a cross sectional representation of a further embodiment of the manufacturing tool according to the invention in an open state, FIG. 17 an example of a plastic film component that can be made with a tooling device according to the invention.

The device according to the invention or the tooling device 10 according to the invention relates to a device for making a plastic film component H or a slush skin having at least one recess H1, H2 in the interior or on the edge of the plastic film component H. Plastic film component H may particularly be used as a decorative layer for making a trim component with the decorative layer. In this case, the trim component comprises a supporting element and a film component H which coats said supporting element. For example, the trim component is produced by placing film component H on a surface of the supporting element or backfoaming film component H with a curable material to create a supporting element.

The trim component to be produced may be for example an armrest trim part or an instrument panel for the interior space of a motor vehicle.

Tooling device 10 for making a plastic film component H includes:

a molding tool 20 comprising of a molding part 30 with a molding part inner surface 30a, a receptacle 40 and opening and closing device 70, by which molding part 30 and receptacle 40 are movable relative to each other between a closed and an open position, at least one covering device 50 with a covering surface 50a for creating at least one recess H1 in plastic film component H and a guide arrangement F, with which covering device 50 is movable between a covered position, in which covering surface 50a covers covered section 31 of molding part inner surface 30a, and an exposed position, in which covering surface 50a is moved away from molding part inner surface 30a, wherein the movement between the covered position and the exposed position is coupled mechanically to the movement of molding part 30 relative to receptacle 40.

The opposing surfaces of molding part 30 and receptacle 40 form an interior space S inside molding tool 20. When a covered section 31 of molding part inner surface 30a is covered by covering surface 50a to generate an recess H1, at least a border section is adjacent to molded part inner surface 30a. It may also be provided that the shape of covered section 31 and the shape of covering surface 50a complement each other, so that in the covered position covered section 31 and covering surface 50a lie flush against one another. In this context, the term "shape" is understood to mean the spatial course of covered section 31 and/or covering surface 50a.

Tooling device 10 may comprise a connecting device 60, with which molding tool 20 may be coupled to a pivot bearing device so that molding tool 20 may be mounted so as to be rotatable about a pivot axis D between a home position and a powder deposition position. Tooling device 10 may also comprise a rotary motor, which is coupled with connecting device 60 mechanically, e.g., via a drive axle to rotate molding tool 20.

Molding part 30 may be bowl-shaped, that is to say it may be designed as a slush bowl. Molding part 30 comprises a molding part inner surface 30a, which comprises at least one covered section 31 and shaping contour surface section 32. Covered section 31 is defined by the respective covered position of at least one covering device 50, since in the covered position each covering surface 50a of a covering device 50 covers a covered section 31 of molding part inner surface 30a. According to one embodiment, when a covering device 50 is in the covering position the respective covering surface 50a may lie flush against covered section 31 of molding part inner surface 30a. Alternatively, it may be provided that the respective covering surface 50a may comprise a peripheral raised border, so that when covering device 50 is in the working position the peripheral raised border rests on molding part inner surface 30a, thereby both delimiting and covering covered section 31.

Shaping contour surface section 32 is provided to ensure that the film component H to be produced from molten material is in fact formed thereon to create film component H. Because covered section 31 of molding part inner surface 30a is covered by covering surface 50a, no material for forming film component H is able to accumulate on covered section 31, so that film component H is created in the area of shaping contour surface section 32, and not in the area of covered section 31, in which the film component H produced comprises an recess or opening H1.

In order to make plastic film component H or the slush skin, molding part 30 is heated to a temperature above the melting temperature of material M, so that material M, which lies on molding part inner surface 30a, melts thereon. The starter material for decorative skin H may be formed from or comprises a thermoplastic material, e.g., polyvinyl chloride (PVC), polyurethane (TPU). The material for forming film component H may in particular be a powder material. For example, material M may be formed from or comprises TPU powder. In the embodiment of tooling device 10 with a connecting device 60 to the pivot bearing of molding tool 20 on a pivot bearing device, molding tool 20 is initially positioned in a home rotary position, in which receptacle 40 is located below molding part 30 relative to the direction of gravity, and material M for forming film component H is located in receptacle 40. In this home rotary position, molding part 30 and receptacle 40 are in a closed position relative to each other, in which molding part 30 and receptacle 40 lie flush with one another, delimiting a tool interior space S, and covering surface 50a of the covering device 50 guided by guide arrangement F covers a covered section 31 of molding part inner surface 30a. In this context, the term "below" is particularly understood to mean that at least 50% of the structure of receptacles 40 is located below molding tools 20. In the figures, a body axes system with coordinate axes X, Y, Z is used on receptacle 40, wherein the coordinate system is defined such that the X axis is aligned in the direction of pivot axis D, the Y axis extends in the opposite direction to the direction of gravity when molding tool 20 is in its home position. Then, the Y axis as the vertical axis of the molding tool may in particular be defined such that it stands vertically on the flat surface M1 of the powdery material M in receptacle 40 when receptacle 40 is half full of said material and receptacle 40 is in a rotary position in which the surface of the powdery material M comprises a minimal surface area.

Then, tooling device 10 with molding tool 20 is rotated to a rotated position in which molding tool 20 is located above receptacle 40 relative to the direction of gravity and the Y direction is aligned with the direction of gravity, so that material M for forming film component H is deposited on shaping contour surface section 32 of molding part 30, that is to say on the surface area of molding part 30 located outside of the covered section 31 which is covered by covering surface 50a. Material M is cooled or cools after a predefined minimum time, so that after cooling it can be removed as film component H from the molding dish or molding part 30. Shaping contour surface section 32 of molding part 30 is designed so that the film component H made therewith comprises a predetermined, three-dimensional shape, that is to say it can be described in three dimensions, with which film component H may advantageously be laminated, particularly without distortions in the flat extension thereof, or without creases onto the supporting element.

Guide arrangement F serves to create a coupling of the relative movement between molding part 30 and receptacle 40 and the movement of the covering surface 50a of covering device 50 between the covered position and the exposed position relative to molding part inner surface 30a. Covering surface 50a moves to the covered position when a border section 35 of molding part 30 and a border section 45 of receptacle 40 are brought together by opening and closing device 70, to form a connecting section, and covering surface 50a moves to the exposed position when border section 35 of molding part 30 and border section 45 of receptacle 40 are separated by a minimum distance.

As is shown in the embodiment of FIG. 1, opening and closing device 70 may be designed such that the movement of molding part 30 relative to receptacle 40 includes a translational movement component, that is to say it is curved and in particular straight. The movement component may particularly comprise a movement component in the Y direction. To this end, opening and closing device 70 comprises at least one guide track 71 attached to receptacle 40 or at least two guide tracks 71 attached to receptacle 40. In the configuration with at least two guide tracks 71, said guide tracks may be arranged on oppositely placed lateral sections of molding tool 20, and may comprise at two least two guide track bearing sections 72 which are conformed on molding part 30 and located on two oppositely placed sides of molding part 30 in such manner that each engages in one of guide tracks 71, so that molding part 30 is movable along guide tracks 71 and is guided thereby relative to receptacle 40. According to a further embodiment, more than two guide tracks 71 and guide track bearing sections 72, of which each engages in one guide track 71, are arranged in even or uneven distribution above the periphery of molding tool 20. Opening and closing device 70 may also be configured differently. In particular, opening and closing device 70 comprises a centring bush. For example, guide tracks 71 may be attached to the sides of molding tool 20 and guide track bearing sections 72 may be conformed on receptacle 40.

Figure 2:
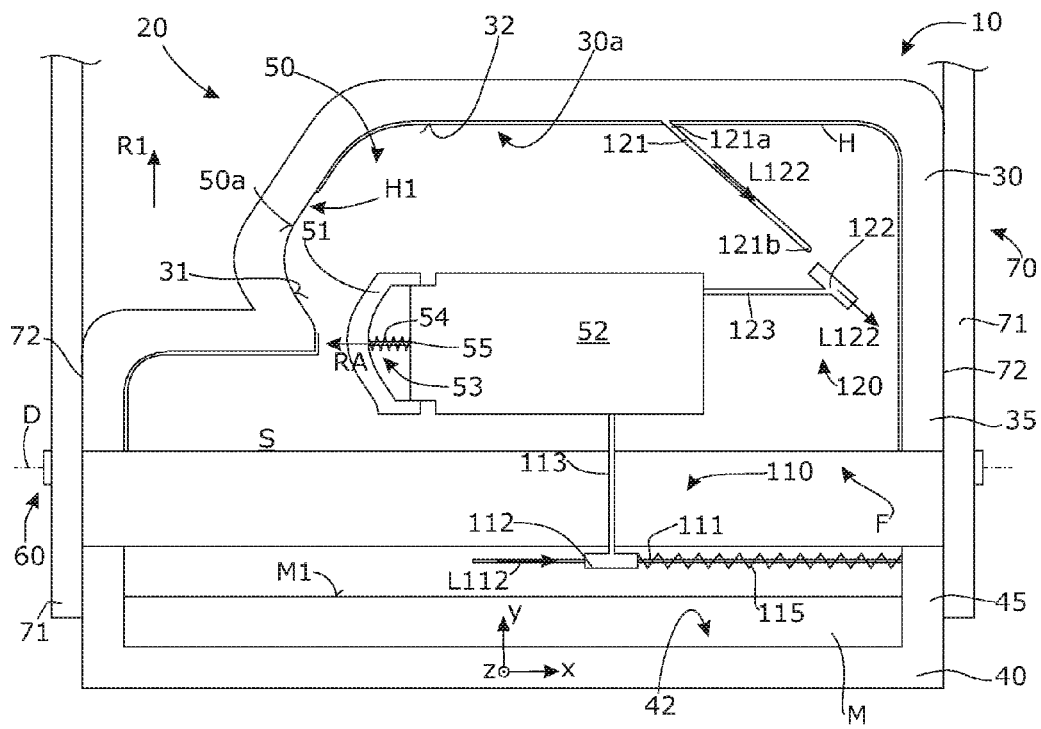

FIGS. 1 and 2 show a first embodiment of the inventive tooling device 10 for making plastic skins H with at least one recess H1. Tooling device 10 comprises molding tool 20 with molding part 30, receptacle 40, covering device 50 and guide arrangement F.

In the embodiment shown, covering device 50 comprises a covering element 51 with covering surface 50a to cover a covered section 31 of molding part inner surface 30a and to create a recess H1, a base body 52, a biasing device 53 that couples covering element 51 with base body 52 and also biases covering element 51 in an extended position relative to base body 52, wherein covering element 51 may be pressed towards base body 52 into a retracted position in a pressing movement direction RA against the biasing force exerted by biasing device 53. To this end, biasing device 53 may include one or more springs, or it may be one or more springs or another component which is compressible against pressing movement direction RA. Biasing device 53 may be in the form of a pneumatic spring such as a pneumatic cylinder. Alternatively, as represented in FIG. 1, biasing device 53 may comprise of a helical spring and optionally a guide pin 55 that is surrounded by the helical spring and may lie flush against the helical spring along its length or at least sections thereof. Guide pin 55 may be attached to covering element 51 or base body 52 and extend in a pressing movement direction RA of covering elements 51 relative to base body 52. In the embodiment of biasing device 53 with or without a guide pin 55, the respective end of biasing device 53, for example, may be fixed to one or both of the following parts: (a) covering element 51, and/or (b) base body 52.

In general, that is to say in the embodiments according to the invention, covering device 50 may be formed from covering element 51 and without a base body 52, on which covering element 51 is arranged so as to be movable or immovable relative to the base body 52.

Guide arrangement F generally includes a first guide device and a second guide device. The first guide device comprises the function of guiding the movement of covering device 50 relative to covered section 31 between a home position and a powder deposition position. The second guide device comprises the function of transmitting the recess or closing movement of opening and closing device 70 to the covering device 50 in such manner that the covering device 50 moves along the first guide track and is driven for this purpose. The second guide device is thus an actuator for the movement of covering device 50.

In the embodiment of FIG. 1, first guide device 110 includes: a first guide track 111, one end 111a of which is fixed or attached to receptacle 40, and a first coupling element 112 fixed or attached to covering device 50, which coupling element is coupled in guiding manner to first guide track 111, so that first coupling element 112 is movable along first Guide track 111. First guide track 111 comprises a second end 111b, which is located opposite to first end 111a and protrudes into interior space S. In the embodiment of FIG. 1, first end 111 of first guide track 111 is attached to a side of receptacle 40, which—viewed transversely to the lengthwise direction L111 of first guide track 111—is located opposite covered section 31. Alternatively, first guide track 111 may also be located on the same side of receptacle 40 as covered section 31. First guide device 110 is designed such that it guides the movement of first coupling element 112 on first guide track 111.

First guide device 110 may also be constructed differently, for example as a rail guide, a roller guide or a sliding guide.

Multiple covering devices 50 may also be fastened to first coupling element 112, and may be arranged side by side when looking down on molding part inner surface 30a, so that one recess H1 may be created by each covering device 50.

Alternatively, it may be provided that tooling device 10 includes a combination according to the invention of a first guide device 110 and a second guide device 120 provided for each of the covering devices 50, so that multiple covering devices 50 are coupled to a first guide device 110 and a second guide device 120.

Figure 4:
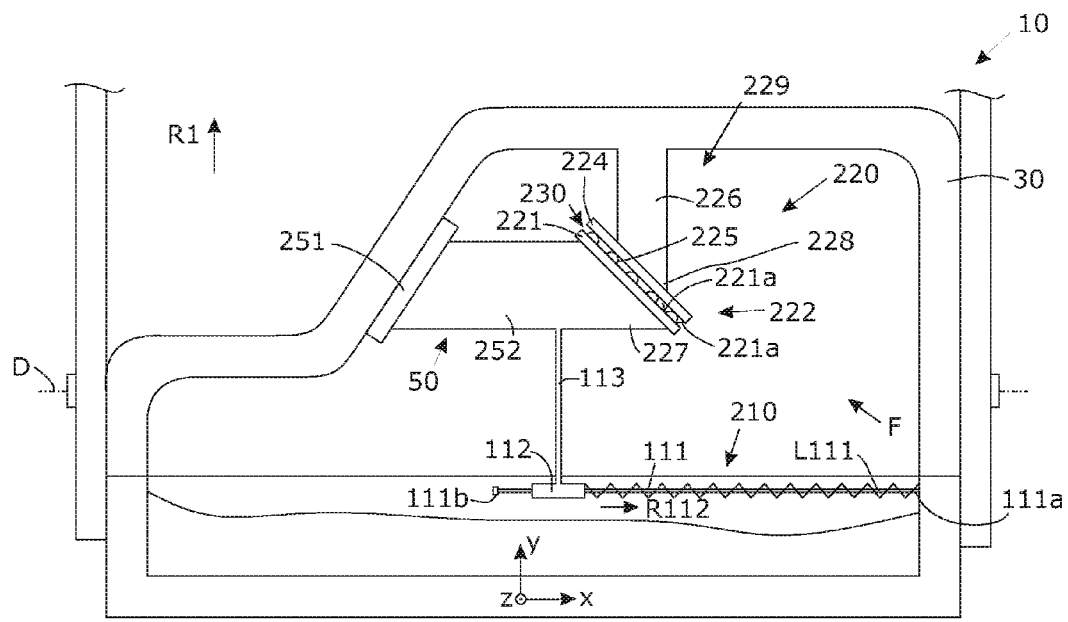

In the embodiment of covering device 50 with a base body 52 and a covering body 51 arranged movably thereon, the first coupling element 112 may be fixed or attached to base body 52. Conversely, it may also be provided that first guide track 111 is fixed on covering device 50 and if necessary on base body 52 thereof, and that first coupling element 112 is fixed on receptacle 40. First coupling element 112 may be attached to covering device 50 and/or a base body 52 thereof via a connecting device 113, e.g., in the form of a retaining arm as shown in FIG. 4.

Regarding the invention generally, as may also be discerned in FIG. 1, it may be provided in particular that the orientation of covered section 31 extends along pivot axis D, at least in a central area thereof and in the same way the first guide track, particularly first guide track 111, also extends along pivot axis D. The central area of the surface section may particularly be defined as a circular area around the centroid of the covered section 31, as the centre thereof, wherein the circular area occupies half the surface area of covered section 31. This aspect may be incorporated in other embodiments of the tooling device 10 according to the invention.

Molding tool 20 may include a biasing device 115, with which covering device 50 is biased to the exposed position. According to the embodiment of FIG. 1, biasing device 115 may be designed as a tension spring, wherein the first end thereof may be fastened to first coupling element 112 and the second end to first guide track 111 or receptacle 40.

In the embodiment of FIG. 1, second guide device 120 includes: a first guide component or second guide track 121, which is fixed or attached to molding part 30, and a second coupling element 122 fixed or attached to covering device 50, which is in a guide coupling with second guide track 121, so that second coupling element 122 is movable along second guide track 121. Second coupling element 122 may generally be considered as a second guide component. Second guide device 120 is constructed to ensure that the movement of second coupling element 122 is guided on second guide track 121. An inner surface 122a of second coupling element 122 comprises an inner borehole or a lateral recess which is open in the lengthwise direction of second guide track 121 along coupling element 122. In the embodiment shown, second guide track 121 is attached by a first end 121a to molding part 30 and comprises a free end 121b, which is located opposite first end 122a. Second coupling element 122 also comprises a first end 122a facing the first end 121a of second guide track 121, and a second end 122b located opposite first end 122a.

Second guide device 120 may also be configured differently, for example as a rail guide, a roller guide or a sliding guide.

In the embodiment of covering device 50 with a base body 52 and a covering body 51 arranged movably thereon, the second coupling element 122 may be fixed or attached to base body 52. Conversely, it may also be provided that the second guide track 121 is fixed or attached to covering device 50, and if necessary to base body 52, and that second coupling element 122 is fixed or attached to molding part 30.

Second guide track 121 extends in a lengthwise direction L121, which results as the connecting line of the centroids of the smallest cross sectional areas of guide track 121. Since second guide track 121 may be straight, or at least sections thereof may be curved, lengthwise direction L121 is generally to be understood as a local lengthwise direction. Generally local lengthwise direction R121 preferably extends in a angular range up to 70 degrees, and in particular between ±5 degrees and ±70 degrees to the Y axis or the molding tool vertical axis. In particular, it may also be provided that the orientation of second guide track 121 extends overall in an angular range between 20 degrees and 85 degrees, and in particular between 30 degrees and 60 degrees with respect to the direction of first Guide track 111.

Figure 3:
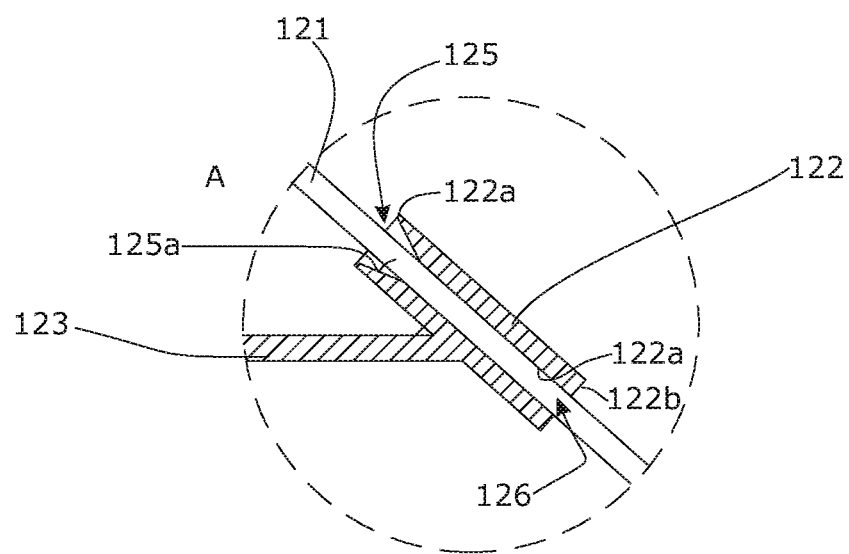

Second guide track 121 may be designed such that when covering device 50 is in the exposed position, coupling element 122 is moved beyond free end 122b and is in a decoupled state. FIG. 3 shows the interaction between second coupling element 122 and second guide track 121. In order to ensure that the decoupled second coupling element 122 may be coupled with the borehole or recess 126 defined by inner surface 122i, a funnel-like flaring of borehole or recess 126 is formed on the inner surface 122i at the first end 122a, wherein the flaring is directed toward first end 122a (FIG. 3).

The embodiment of FIG. 4 shows a further embodiment of covering device 50, which comprises covering element 251 and base body 252, wherein covering element 251 is arranged on base body 252 so as to be immovable relative to the base body. Covering device 50 may also be configured differently, and in particular as described here.

First guide device 110 of the embodiment of FIG. 4 is of the same design as the first guide device of FIG. 1, and in particular includes first guide track 111, the first end 111a of which is fixed or attached to receptacle 40, also first coupling element 112, which is fixed or attached to covering device 50, which is coupled in guiding manner with first guide track 111, so that first coupling element 112 is movable along first guide track 111. First guide track 111 comprises a second end 111b, which is positioned opposite first end 111a and protrudes into interior space S. First guide device 110 is designed such that it is able to guide the movement of first coupling element 112 on first guide track 111. First guide device 110 may also be designed in the described variants thereof.

First coupling element 112 may be attached to covering device 50 via a connecting device 113 in the form of a retaining arm, for example or, as shown in FIG. 4, it may be attached to a base body 252 thereof.

Second guide device 220 includes: a first guide component 221 and a second guide component 222, which bear on each other when molding part 30 and receptacle 40 move to their closed position, being guided along the respective lengthwise directions thereof, being guided alongside one another in their respective lengthwise directions, and deflecting the movement of molding part 30 and receptacle 40 relative to each other to the closed position into a movement of the covering device 50 to the covered position.

In this context, second guide device 220, particularly as shown in FIG. 4, may be designed as follows: A first guide component 221 is arranged on covering device 50, and comprises a first, particularly planar outer guide surface 221a. In this context, the expression "planar" means that the surface is not curved, at least in the area that is significant for the guidance function. In particular, it may be provided that the orientation of first guide surface 221a extends overall in an angular range between 20 degrees and 85 degrees, and in particular between 30 degrees and 60 degrees relative to the direction of first guide track 111. If first guide track 111 is curved, it may in particular be provided that the orientation of first guide surface 221a extends overall in an angular range between 20 degrees and 80 degrees and in particular between 30 degrees and 60 degrees relative to the local directions of first guide track 111. First guide component 221 may be first guide surface 221a itself, or an end section of 227 of covering device 50 with first guide surface 221a, which is positioned opposite the end of covering device 50 on which covering element 251 is located. As is shown in FIG. 4, first guide component 221 may also be designed as a first guide plate, which includes first outer guide surface 221a and is arranged on one end of covering device 50, which is which is positioned opposite the end of covering device 50 on which covering element 251 is located.

In the embodiment of FIG. 4, second guide device 220 includes a second guide component 222, particularly in the form of a plate 224, which is formed by a bracket 226 mounted on molding part 30 and positioned in interior space S, with a second guide surface 222a. Second guide surface 222a is designed to lie flush against first guide surface 221a and preferably planar and with a parallel course to first guide surface 221a. Second guide surface 222a may be conformed on an end section 228 of bracket 226, which protrudes into interior space S, or on a guide plate 224 which is arranged on end section 228. In the design with a bracket 226, when plastic film component H is produced a recess is formed in plastic film component at a joining area 229 between bracket 226 and molding part 30. When plastic film component H is used, it may be provided that this is used as a shaping element, or as an irrelevant area.

One of guide components 221, 222 may include a roller arrangement 230, which comprises at least two rollers. In the diagram of FIG. 4, roller arrangement 230 is part of first guide device 110 and is arranged on the side thereof closest to second guide device 220. Roller arrangement 230 serves to bear on second guide surface 222a. The connecting line of the surface points of the rollers that are currently closest to second guide device 220, and thus also outermost, form a plane which comprises the same orientation as second guide surface 222a, so that the rollers come to bear on second guide surface 222a as soon as molding part 30 and receptacle 40 reach a corresponding intermediate bearing position relative to each other.

Instead of this, such rollers may form part of second guide component 222, and may brought to bear on a first guide surface 221a of first guide component 221.

Accordingly, in the embodiment of FIG. 4 second guide component 222 is generally arranged on one of the components (a) or (b) that is not coupled for movement purposes to first guide device 110, 210, wherein first guide component 221 and second guide component 222 are brought to bear on each other when molding part 30 and receptacle 40 are in an intermediate bearing position, and move toward each other as they approach molding part 30 and receptacle 40, thereby bringing covering device 50 from the exposed position into the covered position.

Figure 5:
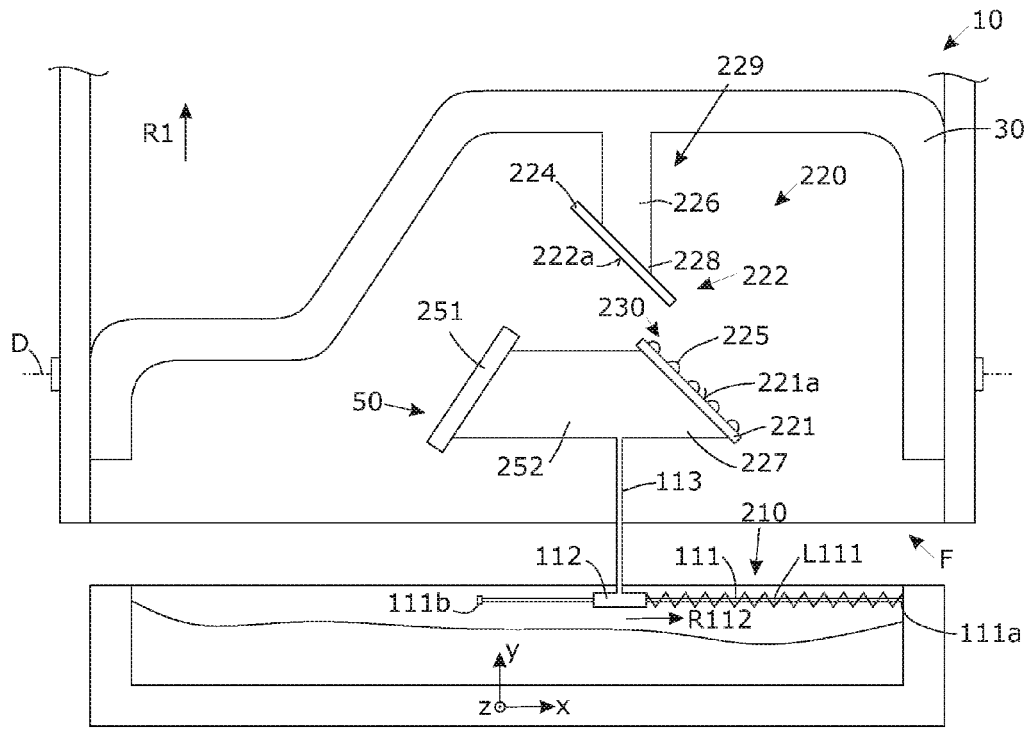

The mode of operation of the specific embodiment of FIG. 4 is revealed by a review of FIGS. 4 and 5 together: the embodiment of the manufacturing tool according to the invention shown in these figures is displaceable between the closed state shown in FIG. 4 and the open state shown in FIG. 5. In the closed state, the one covering device 50 lies with a covering surface 50a for creating at least one recess H1 each in plastic film component H. When tooling device 10 is brought from the open state into a system intermediate state—not shown —, which is located between the open and closed states, the first guide component 221 and the second guide component 222 bear on each other. If the distance between molding part 30 and receptacle 40 is then reduced further, first guide surface 221a and second guide surface 222a move toward each other and covering device 50 is moved on first guide track 111 from the exposed position to the covered position. The reverse process carried out when tooling device 10 performs an recess movement of tooling device 10, in which the distance between molding part 30 and receptacle 40 increases.

Thus, in the embodiment of FIG. 4 also, the movement between the covered position and the exposed position is coupled mechanically to the movement of molding part 30 relative to receptacle 40.

In a variant of the embodiment according to FIG. 4, conversely bracket 226 may be attached or first to receptacle 40 and first guide device 110 on molding part 30. Thus, in the embodiment according to FIG. 4, it is generally first guide device 210 via which the covering device 50 is coupled for movement purposes to one of the components, (a) the receptacle (40) or (b) the molding part 30, and the second guide device 220 which couples covering device 50 to those components (a) or (b) which are not coupled for movement purposes to first guide device 210, wherein guide arrangement F makes it possible for covering device 50 to be moved between a covered position, in which the covering surface 50*a* covers a covered section 31 of molding part inner surface 30*a*, and an exposed position.

In the embodiment of tooling device 10 according to FIGS. 1 and 4, first guide device 110 comprises the function of guiding covering device 50 in a movement relative to receptacle 40. Second guide device 120, 220 comprises the function of transmitting the recess or closing movement of opening and closing device 70 to the covering device 50 in such manner that the covering device 50 is driven along first guide track 111. Second guide device 120 thus functions as the actuator for the tooling device 10.

Figure 6:
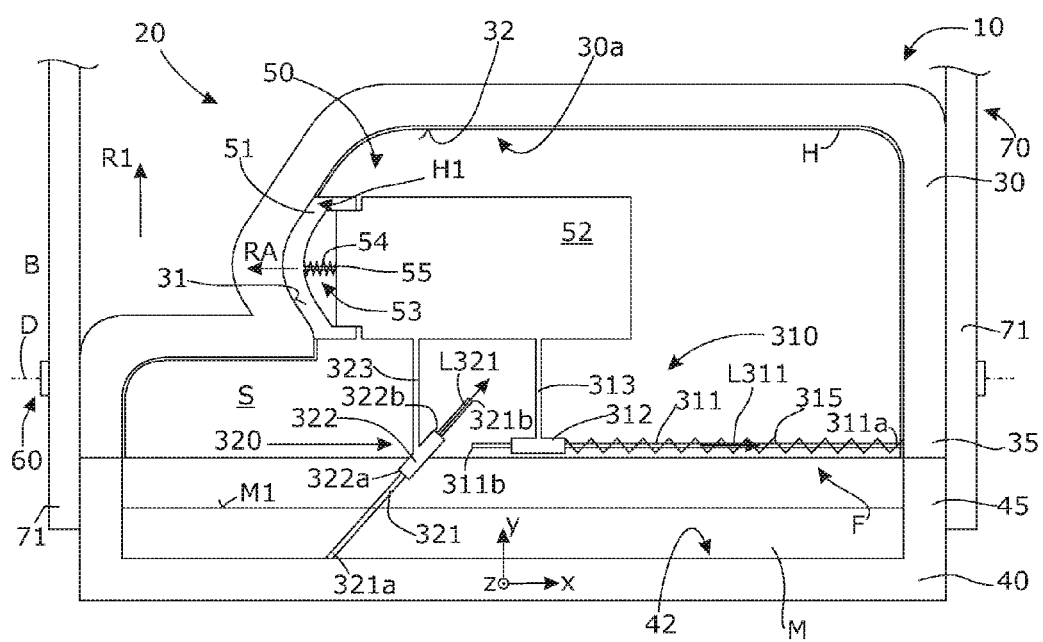

In the embodiment of tooling device 10 of FIG. 6, first guide device 310 is constructed in the same way as the embodiment of tooling device 10 in FIG. 1 and includes: a first guide track 311, a first end 311*a* of which is fixed or attached to molding part 30, and a first coupling element 312 fixed or attached to covering device 50, which coupling element is coupled in guiding manner to first guide track 311, so that first coupling element 312 is movable along first guide track 311. First guide track 311 comprises a second end 311*b*, which is located opposite to first end 311*a* and protrudes into interior space S. First coupling element 312 may be attached to covering device 50 or a base body 52 thereof via a connecting device 313 e.g., in the form of a retaining arm (FIG. 1). Molding tool 20 includes a biasing device 315 similarly to FIG. 1, with which covering device 50 is biased into the exposed position.

In the embodiment of FIG. 6, the first end 311*a* of first guide track 311 is attached to one side of molding part 30, which—viewed transversely to the lengthwise direction L311 of view guide track 311—is located opposite covered section 31. Alternatively, first guide track 311 may also be positioned on the same side as covered section 31.

In the embodiment of FIG. 6, second guide device 320 includes: a second guide track 321, which is fixed or attached to receptacle 40, and a second coupling element 322 fixed or attached to covering device 50, which coupling element is coupled for guidance purposes to second guide track 321, so that the second coupling element 322 is movable along second guide track 321. The essential feature in this context is that guidance of the movement of second coupling element 322 on second guide track 321 is assured. Second guide track 321 extends in a lengthwise direction L321, which is results as the connecting line of the centroids of the smallest cross sectional areas. Since second guide track 321 may be straight, or curved at least in sections thereof, the lengthwise direction L321 is generally to be considered the local lengthwise direction. The generally local lengthwise direction R312 of second guide track 321 preferably lies in an angular range between ±10 degrees and ±65 degrees relative to the Y axis or vertical axis of the molding tool.

The embodiment of tooling device 10 may comprise features of variants that were described with reference to the embodiment of FIG. 1. For example similarly to the funnel-like flaring 125 of FIG. 3, a first end 222*a* of second coupling element 322, which faces first end 321*a* of second guide track 321 on receptacle 40, may be realised with a with a funnel-like flaring of the accommodating borehole that opens towards end 321*a*.

When molding tool 20 opens, molding part 30 moves away from receptacle 40 in recess direction R1, which causes second coupling element 322 also to move away from first end 321*a* towards the opposite, second end 321*b*. Due to the course of second guide track 321, first coupling element 212 is moved toward first end 311*a* of first guide track 311 and covering device 50 away from covered section 31, so that covering surface 50*a* is at a distance from covered section 31. In this state, a plastic film component H formed on shaping contour surface section 32 is then removed from covered section 31 and molding part inner surface 30*a*.

A comparison of the embodiments according to FIG. 1, FIG. 4 and FIG. 6 thus shows that the first guide device is coupled for movement purposes with the covering device and one of the following components:

(a) receptacle 40 or (b) the shaping contour surface of the molding tool component.

In this case, the second guide device the covering device is coupled for movement purposes to the component (a) or (b) which is not coupled for movement purposes to the first guide device.

Figure 7:
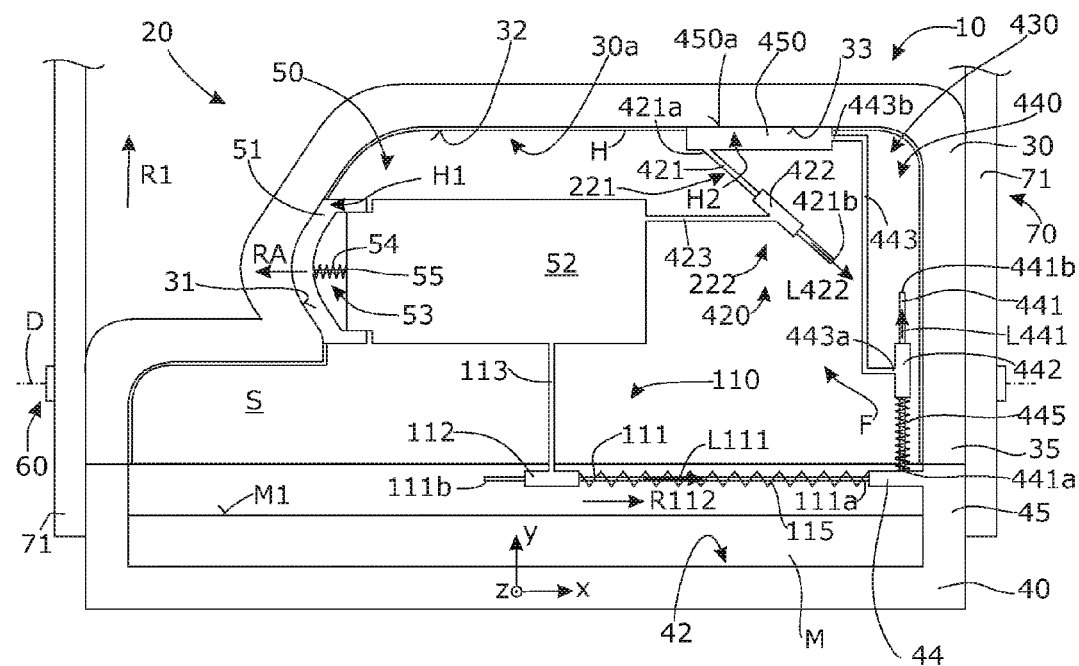
Figure 8:
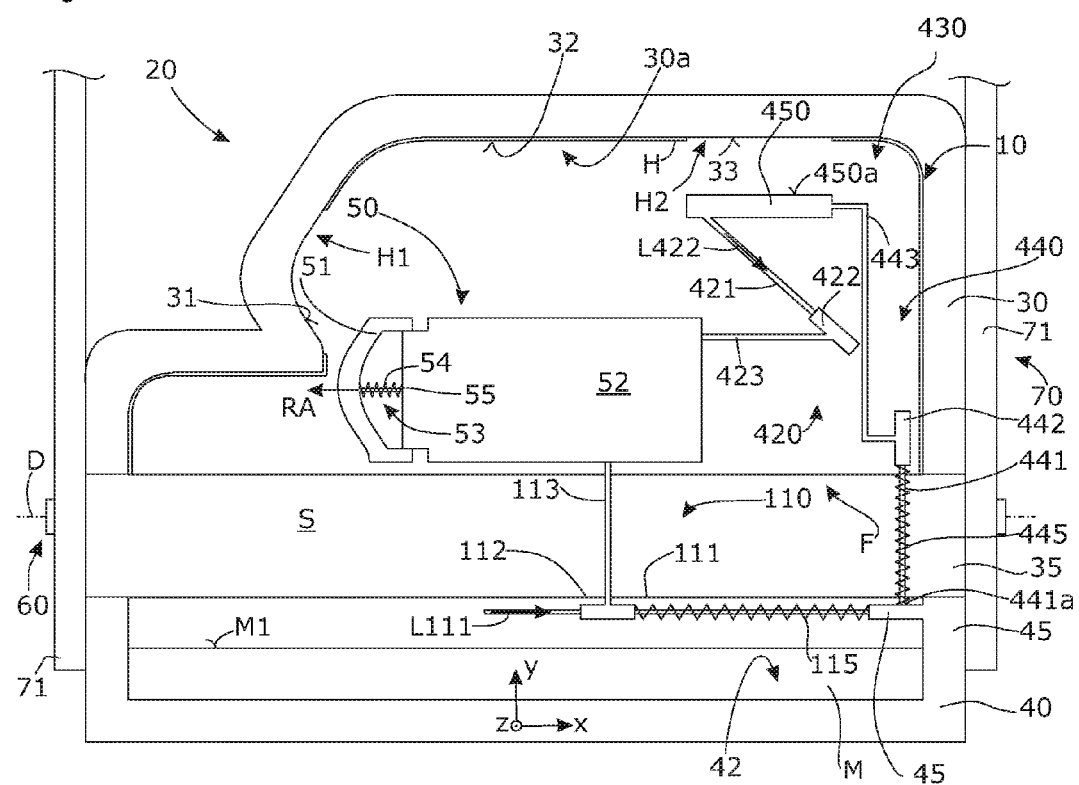

FIGS. 7 and 8 show a further embodiment of the tooling device according to the invention 10, in which first guide device 110 is designed according to the embodiment of tooling device 10 of FIGS. 1 and 2 and may also be constructed according to a variant thereof, wherein covering device 50 is coupled movably to receptacle 40 along a lengthwise direction L111 by first guide device 110. In general, covering device 50 is coupled for movement purposes by the first guide device to one of the components (a) the receptacle 40 or (b) the molding part 30, which are defined generally in this document as the first molding tool component.

Guide arrangement F further includes a second guide device 420, which couples covering device 50 movably relative to abutment device 450 along a second lengthwise direction L422 which differs from first lengthwise direction L111. In general, the possibly locally different orientations of lengthwise directions L111, L422 may lie in an angular range between 20 degrees and 85 degrees and in particular between 30 degrees and 60 degrees.

Second guide device 420 of the embodiment of FIGS. 7 and 8 may particularly include: a second guide track 421, which is attached or coupled to receptacle 40, and a second coupling element 422 which is fixed or attached to covering device 50, and which is coupled for guidance purposes to second guide track 421, so that second coupling element 422 is movable along second guide track 421 and guidance of the movement of second coupling element 422 on second guide track 421 is assured. In the embodiment of covering device 50 with a base body 52 and a covering body 51 that is arranged movably thereon, the second coupling element 422 may be attached and particularly fixed to base body 52.

When the first and second molding tool components move from an open to a closed position of molding tool 20, abutment device 450 and the respective second molding tool component are brought to bear on each other in an intermediate position referred to as the molding tool bearing position, and under the effect of the first and second guide devices covering surface 50*a* is moved from an exposed position, in which covering surface 50*a* is at a distance from molding part inner surface 30*a* and abutment device 450 is at a distance from the primary component, and is brought to bear on a covered section 31 of molding part inner surface 30*a*.

The embodiment of FIG. 7 includes an activation device 430 having an abutment device 450, which couples second coupling element 422 and receptacle 40 to each other, as shown in FIG. 7, when first guide device 110 is coupled to receptacle 40. Activation device 430 is designed in such manner that abutment device 450 bears on molding part 30 at least during a movement end stage when tooling device 10 is being closed or when molding part 30 and receptacle 40 move to the closed position thereof. In particular, activation device 430 couples covering device 50, abutment device 450 and receptacle 40 and a respective second molding tool component. When molding part 30 and receptacle 40 move to their closed position, abutment device 450 and the respective second molding tool component are brought to bear on each other, and covering surface 50a is moved from an exposed position, in which covering surface 50a is located at a distance from molding part inner surface 30a and abutment device 450 is located at a distance from the primary component, and is brought to bear on a covered section 31 of molding part inner surface 30a.

Activation device 430 includes a bracing device 440, which is fixed on receptacle 40 as the respective first molding tool component. Activation device 430 also comprises a control device in the form of guide track 421, which is fixed on abutment device 450, and forms a first guide component 221 of second guide device 220, so that at least in a movement stage for closing the molding tool 20, in which abutment device 450 and molding part 30 as the respective second molding tool component bear against each other, the relative movement between abutment device 450 and receptacle 40 as the first molding tool component is transmitted to the first guide component 221 of second guide device 420.

In this case, abutment device 450 and molding part 30 bear on each other at least in a movement stage of the opening and closing movement that includes closing.

In the embodiment represented in FIG. 7, second guide device 420 is configured as follows:

A first end 421a of second guide track 421 is brought to bear on an abutment device 450 with a bearing surface 450a. Abutment device 450 may in particular be designed as a second covering device for creating a further recess H2 in the plastic film component H that is to be made, so the tooling device 10 includes first covering device 50 and second covering device 450 for making recesss H1, H2 in plastic film component H. Second Guide track 421 further includes a free end 421b, which is located opposite first end 421a. Conversely, it may also be provided that second guide track 421 is fixed or attached to first covering device 50 and optionally fixed or attached to base body 52, and that the second coupling element 422 is fixed or attached to covering device 450. Second coupling element 422 forms a second guide component 222 of second guide device 220.

Abutment device 450 is provided to cover a second covered section 33 of molding part inner surface 30a while plastic film component H is being made, so that molding part inner surface 30a comprises shaping contour surface section 32 and first and second covered sections 31, 33. Multiple abutment devices 450 may also be fastened to second guide track 421, and positioned side by side when molding part inner surface 30a is viewed from above.

Second guide track 421 extends in a lengthwise direction L421, which also results in a connecting line of the centroids of the smallest cross section areas in each case of guide track 421. Since the second guide track 421 is straight, or may be curved at least in sections, lengthwise direction L421 is generally to be understood as a local lengthwise direction.

In the embodiment shown, activation device 430 is configured in detail as follows: Abutment device 450 is connected to a third coupling element 442 via a connecting device 443. Connecting device 443 is designed as a rigid connector. It may also take the form of a transmission mechanism, such as a gearing device. In the embodiment of FIG. 7, connecting device 443 comprises a rod-like structure and is fastened to third coupling element 442 via a first end 443a thereof and is fastened to abutment device 450 via a second end 443b. Third coupling element 442 is coupled to a third guide track 441, which is fastened to receptacle 40 or a support section 45 thereof. The local lengthwise direction L441 of the third guide track 441 preferably extends along the Y axis. In the embodiment of FIG. 7, the third guide track 441 as a bracing device 440 is fastened by a first end 441a to support section 44 and may protrude away from this, so that the end 441b positioned opposite this end forms a free end. Alternatively, end 441b may also be braced on a bracing device of receptacle 40. Activation device 430 may include a biasing device 445 in particular in the form of a spring which is mounted between receptacle 40 or support section 45 and the third coupling element 442 and biases third coupling element 442 in a direction toward molding part 30 when viewed from the direction of the receptacle 40.

In particular, it may be provided that the orientation of second guide track 421 lies overall in an angular range between 20 degrees and 85 degrees and in particular between 30 degrees and 60 degrees relative to the direction of first guide track 111. If first guide track 111 is curved, it may be provided in particular that the orientation of second guide track 421 extends overall in an angular range between 20 degrees and 85 degrees and in particular between 30 degrees and 60 degrees to the local direction of first guide track 111.

Alternatively or in addition thereto, it may particularly be provided that the orientation of the movement created by activation device 430 extends overall in an angular range between 20 degrees and 85 degrees and in particular between 30 degrees and 60 degrees relative to the direction of first guide track 111. If first guide track 111 is curved, it may particularly be provided that the movement initiated by activation device 430 extends overall in an angular range between 20 degrees and 80 degrees and in particular between 30 degrees and 60 degrees to the local directions of first guide track 111.

When molding tool 20 is opened by moving molding part 30 away from receptacle 40, second coupling element 422 is moved on second guide track 421 in lengthwise direction L441 thereof towards second end 421b. Guide arrangement F may be designed such that it causes abutment device 450 to be moved from its covering position, in which it bears on molding part inner surface 30a and covers covered section 33, to the exposed position, in which covering surface 50a is located at a distance from molding part inner surface 30a. Depending on the embodiment, that is to say in the embodiment shown in FIG. 7, third coupling element 442 is simultaneously moved in the lengthwise direction L441 of third guide track 441 towards second end 441b. A compression spring 445 or a biasing device may be arranged on the third guide track 441 and between the first end 441a thereof and third coupling element 442, which spring presses third coupling element 442 in the lengthwise direction L441 shown in FIG. 7 to press abutment device 450 against molding part inner surface 30a with molding tool 20 in the closed state and to cover covered section 33 as tightly as possible.

In a variant not shown in the figures, but configured similarly to the embodiment of FIG. 6, both the first guide device and second guide device 420 are coupled to receptacle 40. In this way, the activation device is coupled with the same function both to second coupling element 422 and to molding part 30, just as first guide device 110 is also coupled to molding part 30. The activation device is designed such that abutment device 450 bears on molding part 30 at least in a movement end stage when tooling device 10 is being closed or when molding part 30 and receptacle 40 are being moved to the closed position thereof. The activation device is designed such that abutment device 450 bears on receptacle 40 at least in a movement end stage when tooling device 10 is being closed or when molding part 30 and receptacle 40 are being moved to the closed position thereof, and brings abutment device 450 and receptacle 40 to bear on each other when molding part 30 and receptacle 40 are moved to their closed position and through the coupling of activation device with receptacle 40, moves covering surface 50a to bear on a covered section 31 of molding part 30 from an exposed position in which covering surface 50a is located at a distance from molding part inner surface 30a and abutment device 450 is at a distance from molding part 30.

All embodiments described with reference to FIG. 7 may also be provided in this second variant. In particular, it may be provided in the embodiments described with reference to or similar to FIG. 7 that guide track 421 may be attached or fixed on covering device 50 and second coupling element 422 may be attached or fixed on abutment device 450.

Thus, the embodiments described with reference to or similar to FIG. 7 are equipped with a guide arrangement F with:

a first and a second guide device 410, via which each covering device 50 is coupled to one of the components (a) receptacle 40 or (b) molding part 30 as the first molding tool component, wherein the other component (a) or (b) in each case is a second molding tool component, activation device 430, which brings abutment device 450 and the respective second molding tool component to bear on each other when molding part 30 and receptacle 40 are moved to their closed position, and by coupling of activation device 430 with the respective first molding tool component the covering surface 50a is moved from an exposed position, in which covering surface 50a is at a distance from molding part inner surface 30a and abutment device 450 is at a distance from the primary component, to bear on a covered section 31 of molding part inner surface 30a.

Figure 9:
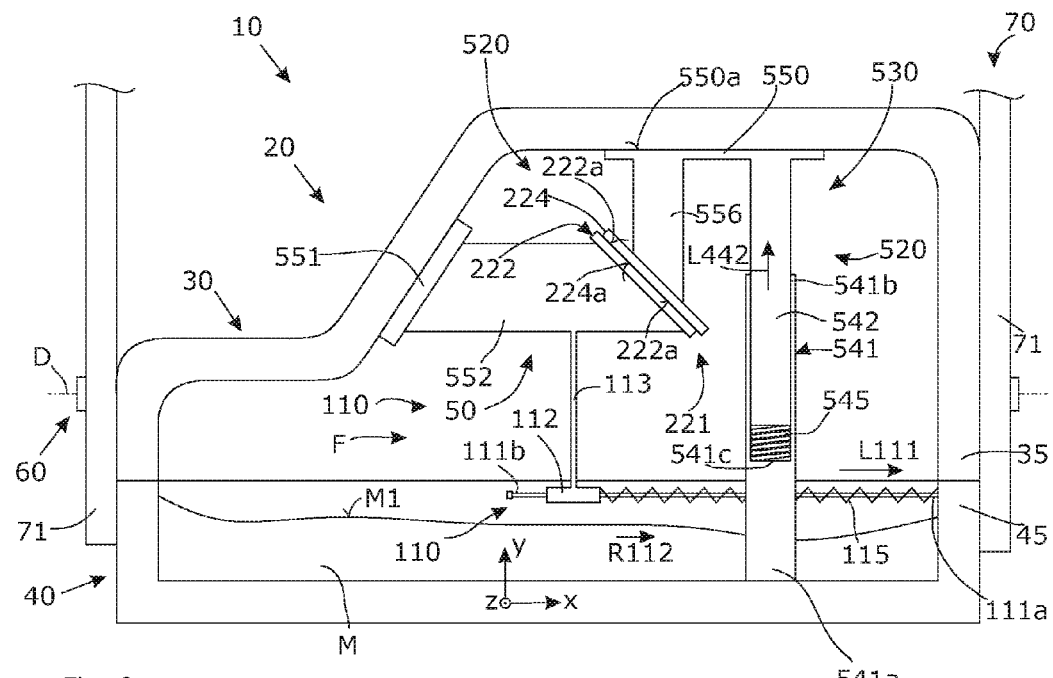

The embodiment according to FIG. 9 is based on the embodiment of FIG. 7.

In the embodiment of FIG. 9, first guide device 110, which is configured as in FIG. 1, couples covering device 50 movably along a lengthwise direction L111. First guide device 110 may also be designed differently. In the embodiment shown, covering device 50 and in particular a base body 52 thereof is coupled to a first guide device 510 in the form of a longitudinal guide, and guided to control the movement of covering device 50, and in particular of base body 52 with respect to molding part 30 between the exposed and the covered positions.

An activation device 530 couples at least in sections the movements of abutment device 550 and molding part 30 relative to receptacle 40. The second guide device 520 couples the movements of the covering device 50 and the abutment device 550.

Figure 10:
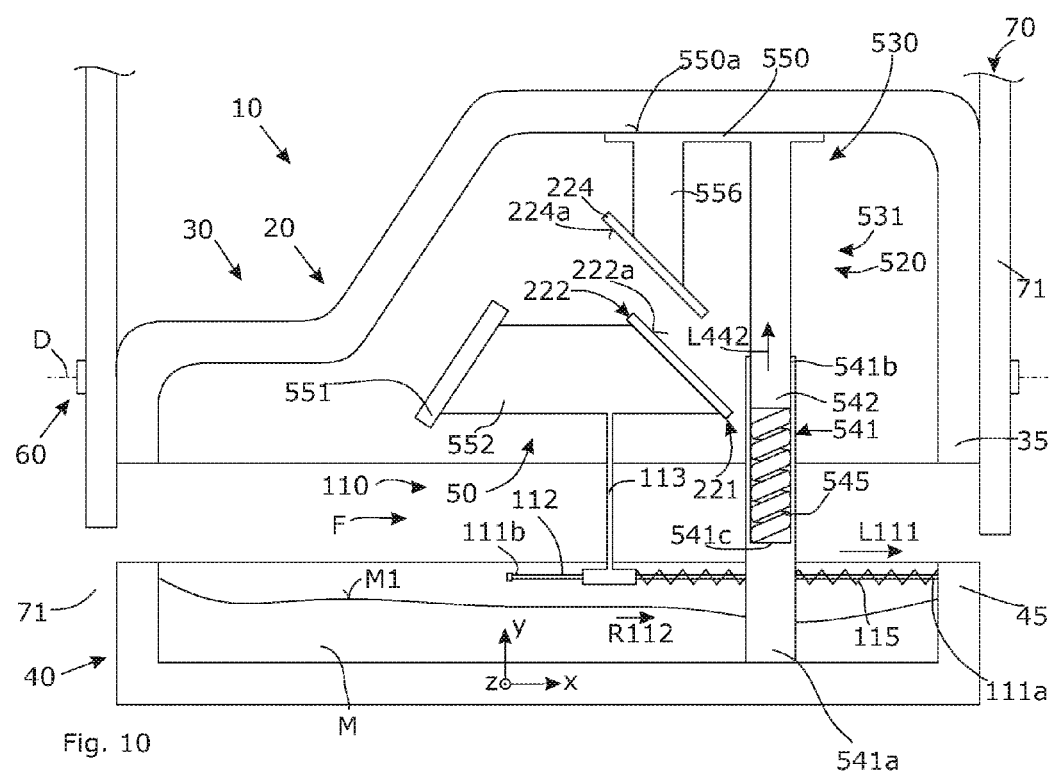

FIGS. 9 and 10 show one embodiment of essentially two embodiments, in which the first guide device couples covering device 50 to one of the components (a) receptacle 40 or (b) molding part 30 for movement purposes, designated herein generally as the first molding tool component, and the second guide device couples covering device 50 to abutment device 550 for movement purposes, wherein the respective other component (a) or (b) is defined as a second molding tool component, wherein when the first and second molding tool components move from an open to a closed position of molding tool 20, abutment device 550 and the respective second molding tool component are brought to bear on each other in an intermediate position referred to as the molding tool bearing position, and under the effect of the first and second guide devices covering surface 50a is moved from an exposed position, in which covering surface 50a is located at a distance from molding part inner surface 30a and abutment device 550 is located at a distance from the primary component, to bear on a covered section 31 of molding part inner surface 30a.

In the embodiment represented in FIG. 9, first guide device 110 couples covering device 50 with receptacle 40 movably along the first lengthwise direction L111 as the respective first molding tool component. Second guide device 520 with a first guide component 221 and a second guide component 222 couples the movement of covering device 50, which is caused by the movement of the respective second molding tool component, to the movement of a control device 556 installed in fixed manner in abutment device 550.

Second guide device 520 may in particular also be of the same design as the second guide device 220 of FIG. 4 or, as represented, the second guide device 620 of FIG. 11, and may comprise the features described respectively for each, or it may be designed as the variants described therefor. Second guide device 520 includes: a first guide component 221 extending flat in a lengthwise direction and in particular having the form of a plate and fixed to control device 556, and a second guide component 222 extending flat in a lengthwise direction and in particular having the form of a plate and fixed to covering device 50 or the base body 52 thereof, which bear on each other during a movement of molding part 30 and receptacle 40 into their closed position, and which are guided alongside each other in their respective lengthwise directions, thereby deflecting the movement to the closed position of molding part 30 and receptacle 40 relative to each other into a movement of covering device 50 to the covered position. In this context, second guide device 520 may particularly be designed according the FIG. 4 and comprises the features that were described with reference to the embodiment of FIG. 4. An adjusting lever 556 is also fastened to covering device 450.

Activation device 530 is designed in such manner that abutment device 450 bears on molding part 30 at least in a movement end stage when tooling device 10 is being closed, or when molding part 30 and receptacle 40 are moving to their closed position. In particular, activation device 530 couples covering device 50, abutment device 550 and the respective second molding tool component and when molding part 30 and receptacle 40 move to their closed position in a molding tool bearing position brings abutment device 550 and receptacle 40 and a respective second molding tool component to bear on each other and moves covering surface 50a from an exposed position, in which covering surface 50a is located at a distance from molding part inner surface 30a and abutment device 550 is located at a distance from the primary component to a position bearing on a covered section 31 of molding part inner surface 30a. In this operation, abutment device 550 and molding part 30 bear on each other at least in a movement stage of the opening and closing movement that includes closing.

Abutment device 550 is coupled via a connecting device 542 in the form of a guide piston with a third guide track 541 in the form of a guide piston—or vice versa. Third guide track 541 or the guide piston is fastened to receptacle 40 or a support section 45 thereof. The local lengthwise direction L541 of third guide track 541 preferably extends along the Y axis. In the embodiment of FIG. 9, third guide track 541 is fastened by a first end 541a to a support section and projects away from it, so that a free end 541b is formed on the opposite end to the first end. Alternatively, end 541b may also be braced on a bracing device of receptacle 40. Activation device 530 may include a biasing device 545, particular in the form of a spring which is supported between a bottom 541c of third guide track 541 or the receptacle 40 or support section 45 and connecting device 542 or the guide piston, and biases connecting device 542 or the piston into a position towards molding part 30 when viewed from receptacle 40.

In particular, it may be provided that the orientation of the movement initiated by activation device 530 extends overall in an angular range between 20 degrees and 85 degrees and in particular between 30 degrees and 60 degrees relative to the direction of first guide track 111. If first guide track 111 is curved, it may particularly be provided that the movement initiated by activation device 530 extends overall in an angular range between 20 degrees and 80 degrees and in particular between 30 degrees and 60 degrees with reference to the local directions of first guide track 111.

FIGS. 11 and 12 show a further combination of the first guide device 610, the second guide device 620 and that activation device 630 with abutment device 650, which might be implemented in a molding tool 20 according to FIG. 9 and configured in a first alternative in combination with a first guide device 110 according to FIG. 1, for example. Activation device 630 couples the movements of abutment device 650 and molding part 30 relative to receptacle 40 at least in part. In the embodiment represented, covering device 50 and in particular a base body 52 thereof, is coupled to a first guide device 610 in the form of a longitudinal guide and guided between the exposed and the covered positions to control the movement of covering device 50 and in particular of base body 52 with respect to molding part 30. Second guide device 620 couples the movements of covering device 50 and abutment device 650.

FIGS. 11 and 12 show one embodiment of essentially two embodiments, in which the first guide device couples covering device 50 to one of the components (a) receptacle 40 or (b) molding part 30 for movement purposes, designated herein generally as the first molding tool component, and the second guide device couples covering device 50 to abutment device 650 for movement purposes, wherein the respective other component (a) or (b) is defined as a second molding tool component, wherein when the first and second molding tool components move from an open to a closed position of molding tool 20, abutment device 650 and the respective second molding tool component are brought to bear on each other in an intermediate position referred to as the molding tool bearing position, and under the effect of the first and second guide devices covering surface 50a is moved from an exposed position, in which covering surface 50a is located at a distance from molding part inner surface 30a and abutment device 650 is located at a distance from the primary component, to bear on a covered section 31 of molding part inner surface 30a.

In the embodiment represented in FIG. 11, first guide device 610 couples covering device 50 with receptacle 40 movably along the first lengthwise direction L611 as the respective first molding tool component. Second guide device 620 with a first guide component 221 and a second guide component 222 couples the movement of covering device 50, which is caused by the movement of the respective second molding tool component, to the movement of a control device 656 installed in fixed manner on abutment device 650.

The longitudinal guide or first guide device 610 may comprise of a guide track 611 and a guide coupling 612 conformed on covering device 50 and in particular on a base body 52 thereof, which guide coupling is guided in movable or slidable manner on guide track 611 along a first lengthwise direction L611. Guide track 611 is fastened to a bracing device 640 by means of a fastening device 617. Bracing device 640 is fixed on receptacle 40. Second guide device may particularly also comprise the same design as second guide device 220 of FIG. 4 or, as represented, second guide device 520 of FIG. 9, and may comprise the features described respectively for each, or it may be designed as the variants described therefor.

Activation device 630 comprises an abutment device 650 which is substantially of the same construction as abutment device 550 represented in FIG. 9. Activation device 630 includes a bracing device 640 which is fixed on receptacle 40 as the respective first molding tool component. Activation device 630 also includes a control device 656, which is fixed both to abutment device 650 and to the first guide component 221 of second guide device 220, so that the relative movement between abutment device 650 and receptacle 40 as the first molding tool component is transmitted to first guide component 221 of second guide device 520 at least in a movement state including closure of molding tool 20, in which abutment device 650 and molding part 30 as the respective second molding tool component bear against each other.

In the embodiment represented, activation device 630 includes a bracing device 640 fastened to receptacle 40, on which abutment device 650 is guided movably, wherein it bears on molding part 30 at least in a movement end stage during closing of tooling device 10 or when molding part 30 and receptacle 40 move to their closed position.

In the embodiment shown, activation device 630 is configured as follows: A control device or connecting device 656 which may comprise the form of an adjusting lever or adjusting piston corresponding to adjusting lever 556, is fixed on abutment device 650. In order to couple the movement of the control device or connecting device 656 to bracing device 640, a guide track 657 may be conformed thereon—or vice versa, wherein connecting device 656 thereon is mounted so as to be movable between the bearing position that is occupied in a molding tool bearing position and a position at a distance from molding part 30 which occurs for a distance between molding part 30 and receptacle 40 that is greater than the distance thereof in molding tool bearing position. Control device guide track 657 can be formed by two guide track sections conformed on oppositely positioned longitudinal sides of bracing device 640, wherein the guide track sections extended lengthwise side by side.

Abutment device 650 includes a bearing plate 651 with a bearing surface 651a, a rigid baseplate 652 and at least one connecting body 652a, 652a arranged and secured between said components and bearing plate 451. Bearing plate 651 is fastened to baseplate 652 via at least one in particular tubular fastening element 653a, 653b and arranged at a distance from baseplate 652 along lengthwise direction L656 or the direction of movement of the at least one adjusting lever 656. The local lengthwise direction L656 of control device guide track 657 preferably extend along the Y axis.

Bracing device 640 is fastened to receptacle 40 or bearing plate 649 and projects away from it. In the embodiment shown, bracing device 640 comprises the form two in particular tubular bracing elements 641, 642 which are fastened to receptacle 40 or to a bearing plate 649 that can be mounted on or connected thereto. In the embodiment of FIG. 11, bracing elements 641*a*, 641*b* are each fastened by a first end 641*a* and 642*a* to receptacle 40 or bearing plate 649 and project away from it, so the second ends 641*b* and 642*b* positioned opposite the first ends then each form a free end. Activation device 630 may include at least one biasing device 645, particularly in the form of two cooperating biasing components or spring devices 645*a*, 645*b* and particularly wherein each is realised as a spring which is arranged between a bracing plate 646 fastened to the at least one second end 641*b* and 642*b* or directly on the bracing plate 646 fastened to the at least one second end 641*b* and 642*b* and abutment device 650 or baseplate 652, and biases abutment device 650 or baseplate 652 along the direction of movement L656 of control devices 656 into a position, viewed from receptacle 40, towards molding part 30. In this context, abutment device 650 or baseplate 652 is guided on guide track 657 along direction of movement L656 by means of connecting device 656 and the control device.

The activation device described for this embodiment with abutment device 650 and bracing device 640 may be realised in similar manner to those of other embodiments, which are described with reference to FIGS. 7, 9, 11, 13.

In particular, it may be provided that the orientation of the movement initiated by activation device 630 or the movement of abutment device 650 extends overall in an angular range between 90 degrees±45 degrees and in particular between 90 degrees±60 degrees relative to the direction of first guide track 611. If first guide track 611 is curved, it may be provided in particular that the movement initiated by activation device 530 extends overall in an angular range between 20 degrees and 80 degrees and in particular between 30 degrees and 60 degrees with respect to the local directions of first Guide track 611.

Figure 13:
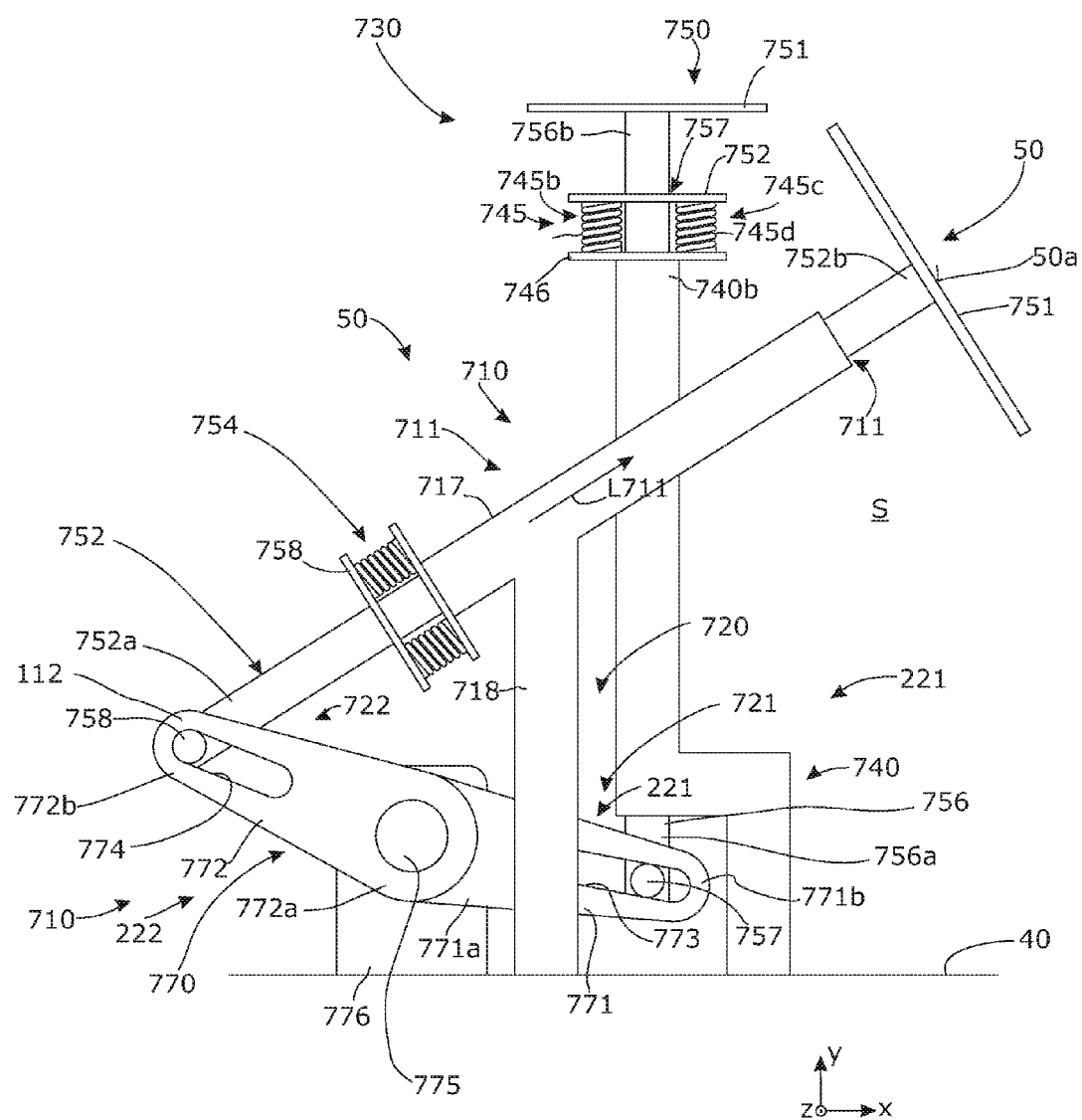

FIG. 13 shows a further combination of a first guide device 710, a second guide device 720 and an activation device 730 with abutment device 650, which may be part of tooling device 10 according to the invention. In this case, the design of activation device 730 is the same or essentially the same as shown in FIGS. 11 and 12.

Covering device 50 of tooling device 10 according to FIG. 13 includes a covering plate 751 and a base body in the form of a control rod 752, which is fixed to a first end section 752*a* on covering plate 751. Covering plate 751 and control rod 752 as single parts may be combined to form one assembly, or they may be produced as an integral part. Control rod 752 is mounted so as to be slidable in a lengthwise direction L711 on a longitudinal guide 711 in the form of a tubular section 717, which is fixed to one of the components (a) receptacle 40 as shown, or (b) molding part 30 as the item generally designated herein as the first molding tool component. Thus, control rod 755 and tubular section 717 form first guide device 710. Tubular section 717 is fixed to the first molding tool component via a bracket 718, that is to say in the embodiment shown it is fixed to receptacle 40. In this way it is possible to allow covering plate 751 to be moved relative to molding part 30 between a covered position and an exposed position.

As shown in FIG. 13, a biasing device 754 may be disposed between the base body or control rod 752 or a bracket 758 formed thereon and tubular section 717, and bias control rod 755 with respect to tubular section 717 into a position in which covering plate 759 bears on molding part 30. Alternatively a biasing device may also be disposed between control rod 752 and covering plate 759 with the same function, similar to the design of covering device 50 according to FIG. 1, if control rod 752 and covering plate 759 are supported so as to be movable in lengthwise direction L711 relative to each other.

FIG. 13 shows one embodiment of essentially two embodiments, in which the first guide device couples covering device 50 to one of the components (a) receptacle 40 or (b) molding part 30 for movement purposes, designated herein generally as the first molding tool component, and the second guide device couples covering device 50 to abutment device 750 for movement purposes, wherein when the first and second molding tool components move from an open to a closed position of molding tool 20, abutment device 750 and the respective second molding tool component are brought to bear on each other in an intermediate position referred to as the molding tool bearing position, and under the effect of the first and second guide devices covering surface 50*a* is moved from an exposed position, in which covering surface 50*a* is located at a distance from molding part inner surface 30*a* and abutment device 750 is located at a distance from the primary component, to bear on a covered section 31 of molding part inner surface 30*a*.

Second guide device 720 includes:
a telescoping body or a telescoping assembly 770, which is mounted rotatably on the first molding tool component,
a first telescoping coupling 721, with which the telescoping body or telescoping assembly 770 is coupled to abutment device 750 for movement purposes, and
a second telescoping coupling 722, with which the telescoping body or telescoping assembly 770 is coupled to covering device 50 for movement purposes.

By means of second guide device 720, the movement of the covering device 50, which is entrained by the movement of the respective second molding tool component and the abutment device 750 arranged thereon can be coupled with the movement of control device 756 fixed on abutment device 750.

Telescoping body 770 may in particular be formed from a first looping body 771 and a second looping body 772 which are attached to each other in non-rotating manner by a first end section 771*a* and 772*a* or both are attached individually in non-rotating manner to a rotary shaft 775. The rotary shaft is mounted rotably on a bearing bush 776, which is fastened to receptacle 40 as the first molding tool component. Looping bodies 771, 722 each comprises a locating slot 773 and 774, which are each formed on a second end section 771*b* and 772*b* which is on the opposite end thereof to the first end section 771*a* and 772*a*. To form the first telescoping coupling 721, a looping body 757 is arranged and guided in locating slot 773, which is formed on a first end section 756*a* of control device 756, which is position on the opposite end section to second end section 756*b*. Abutment device 750 is fixed or fastened to the second end section 756*b*. To form the second telescoping coupling 722 a looping body 758 is arranged and guided in the locating slot 774, and is arranged on a second end section 752*b* of control rod 752 at the opposite end thereof to first end section 752*a*.

Activation device 730 comprises an abutment device 750, which is constructed essentially in the same manner as abutment device 550 shown in FIG. 9. Activation device 730 comprises a bracing device 740, which is fixed to receptacle 40 as the respective first molding tool component by a first end section 740*a*. Activation device 730 may comprise at least on biasing device 745 in particular in the form of two cooperating biasing components or spring devices 745*a*, 745*b*, 745*c*, 745*d* and particularly wherein each is realised as a spring which is arranged between a bracing plate 746 fastened to the at least one second end section 740*a* at the opposite end to first end section 740*a* of bracing device 740, and the abutment device 750 of the baseplate 752 fastened thereto. Biasing device 745 biases abutment device 750 or baseplate 752 along movement direction L756 of the connecting device or the control device 756 into a position in the direction of molding part 30 when viewed from a position from the receptacle 40. Abutment device 750 or baseplate 752 is guided via connecting device 756 and the control device along a guide track 757, which is conformed on bracing device 740 along direction of movement L756.

Activation device 730 also comprises a control device 756 which is fixed both to the abutment device 750 and to the first looping body 771 as a first guide component 221 of second guide device 720, so that at least in one movement section involving closure of the molding tool 20, in which abutment device 750 and molding part 30 as the respective second molding tool component bear on each other, the relative movement between abutment device 750 and receptacle 40 as the first molding tool component is transmitted to first looping body 771 as the first guide component 221 of the second guide device 720 and to the first telescoping coupling 721 and from there to the second looping body 772 as the second guide component 222 of the second guide device 720 and to the second telescoping coupling 722. In this way, the movement of covering device 50 and in particular of base body 752 relative to molding part 30 is guided between the exposed and the covered position.

Figure 14:
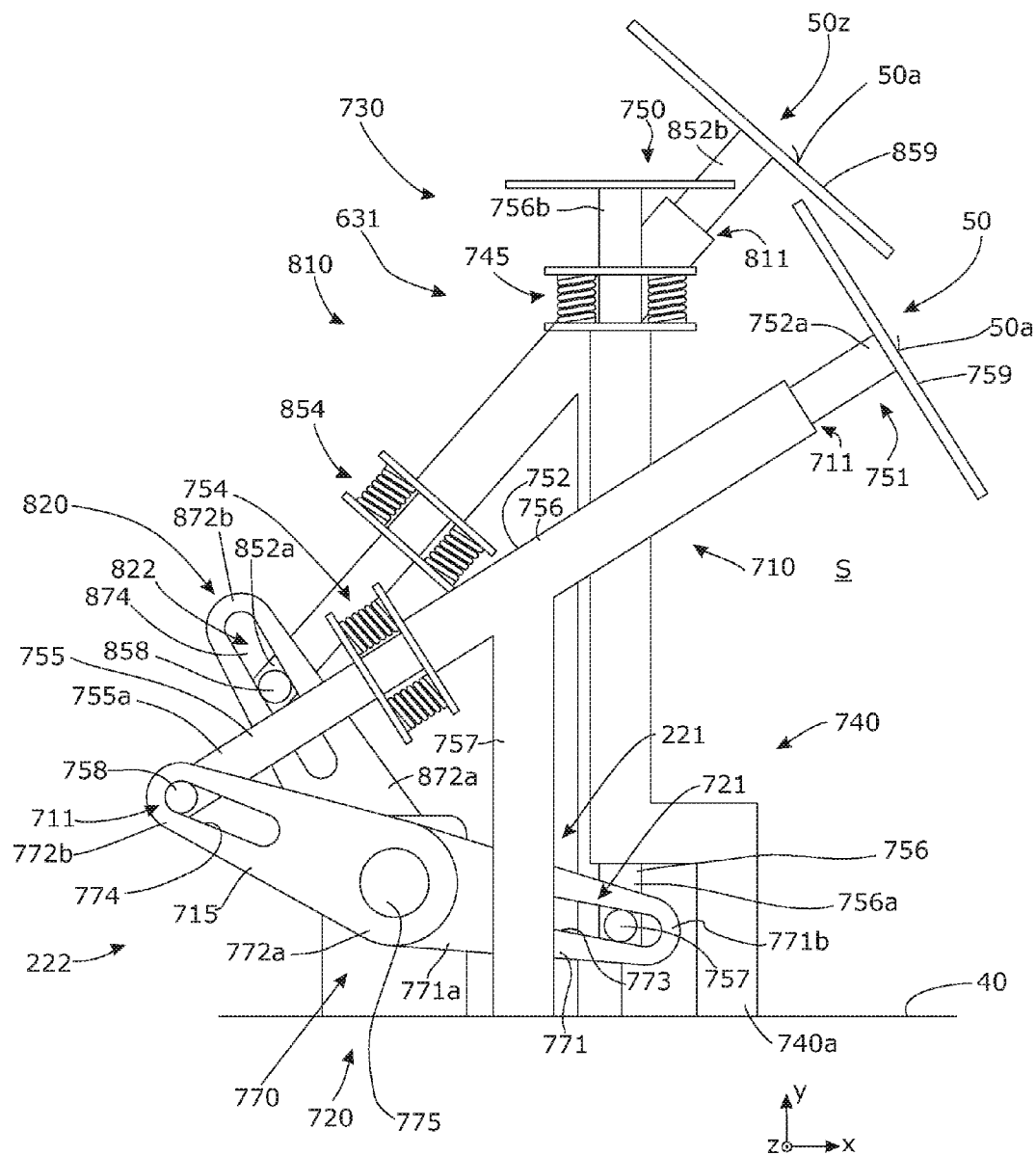
Figure 15:
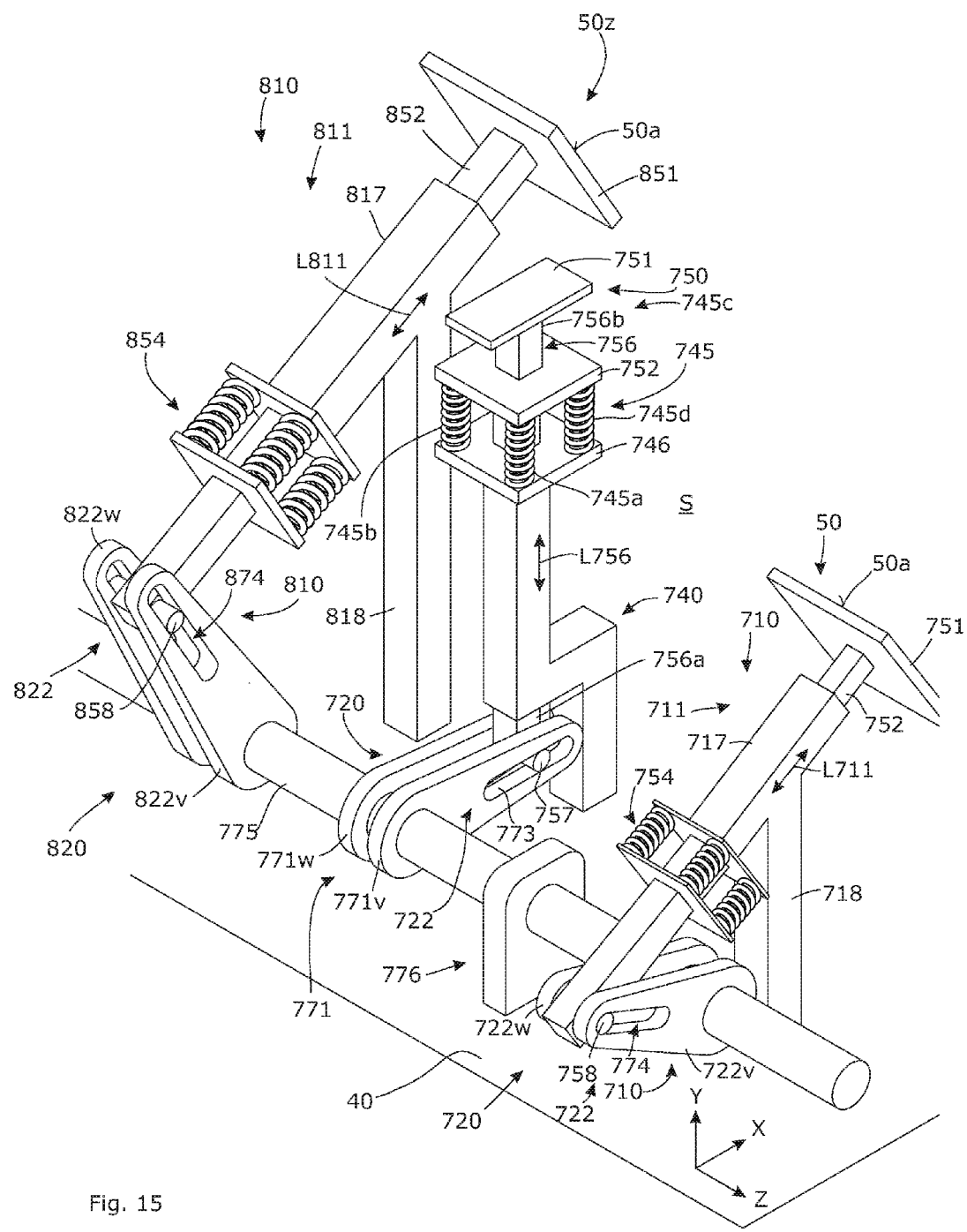

The embodiment according to FIGS. 14 and 15 is based on the embodiment of FIG. 13 and includes activation device 730 with the control device 756 guided in bracing device 740, which control element is configured in the same way as in FIG. 13 or essentially as in FIGS. 11 and 12.

The embodiment of FIGS. 14 and 15 comprises two covering devices 50, 50*z* and two first guide devices 710, 810, wherein both the first guide devices 710, 810 and the covering devices 50, 50*z* are of the same design. Covering devices 50, 50*z* each comprise a covering plate 751 and 851 and a base body in the form of a control rod 752 and 852, which is fixed on covering plate 751 and 851 by a first end section 752*a* and 852*a*. Control rods 752 and 852 are each mounted to be slidable in a lengthwise direction L711 and L811 on a longitudinal guide 711 and 811 in the form of a tubular section 717 and 817, which is fixed to one of the components (a) receptacle 40, as shown, or (b) molding part 30 as is designated generally in this document as first molding tool component. In this way, the control rod 755 and 855 and tubular sections 717 and 817 together form two first guide devices 710 and 810. Tubular sections 717 and 817 are each fixed to receptacle 40 via a bracket 718 and 818 on first molding tool component, that is to say in the embodiment shown on receptacle 40. In this manner, covering plate 751 and 851 may be moved with respect to molding part 30 between a covered position and an exposed position.

Tooling device 10 according to FIGS. 14 and 15 also comprises two second guide devices 720, 820 with which of each covering device 50 and 50*z*, which is caused by the movement of the respective second molding tool component and that abutment device 750 bearing thereon, is coupled to the movement of a control device 756 fixed on abutment device 750. The two second guide devices 720, 820 are formed by:

a telescoping body or a telescoping assembly 770, which is mounted rotatably on the first molding tool component, a first telescoping coupling 721, with which the telescoping body or telescoping assembly 770 is coupled to abutment device 750 for movement purposes, and a second telescoping coupling 722, with which the telescoping body or telescoping assembly 770 is coupled to covering device 50 for movement purposes.

Telescoping assembly 770 is formed from a first looping body 771 and two second looping bodies 772, 872, each of which is fastened in non-rotating manner to a first end section 771*a* and 772*a*, 872*a* to rotary shaft 775. Rotary shaft 775 is supported rotatably on a bearing bush 776, which is fastened to receptacle 40 as the first molding tool component. Looping bodies 771, 722, 822 each comprise a locating slot 773 and 774 and 874, which are each formed on a second end section 771*b* and 772*b* which is on the opposite end thereof to the first end section 771*a* and 772*a* and 872*a*. To form the first telescoping coupling 721, a looping body 757 is arranged and guided in locating slot 773, which is formed on a first end section 756*a* of control device 756, which is position on the opposite end section to second end section 756*b*. Abutment device 750 is fixed or fastened to the second end section 756*b*. To form the second telescoping coupling 722, 822 a looping body 758, 858 is arranged and guided in the locating slot 774, 874 and is arranged on a second end section 752*b*, 852*b* of control rod 752, 852 at the opposite end thereof to first end section 752*a*, 852*a*.

Each looping body may also be designed a looping body pair, each having two looping bodies 771*v*, 771*w*, 722*v*, 722*w* bzw. 822*v*, 822*w* arranged on above the other when viewed in the lengthwise direction of the rotary shaft 775, which may be of identical design and alignment, as is shown in FIG. 15.

Actuation device 730 of tooling device 10 according to FIGS. 14 and 15 comprises the same design actuation device 730 of tooling device 10 according to FIG. 13, so that at least in one movement section involving closure of the molding tool 20, in which abutment device 750 and molding part 30 as the respective second molding tool component bear on each other, the relative movement between abutment device 750 and receptacle 40 as the first molding tool component is transmitted to first looping body 771 as the first guide component 221 of the second guide device 720 and to the first telescoping coupling 721 and from there to the second looping body 772, 872 as the respective second guide component 222 of the second guide device 720, 820 and to the second telescoping coupling 722, 822. In this way, the movement of covering device 50 and in particular of base body 752, 852 relative to molding part 30 is guided between the exposed and the covered position.

Figure 16:
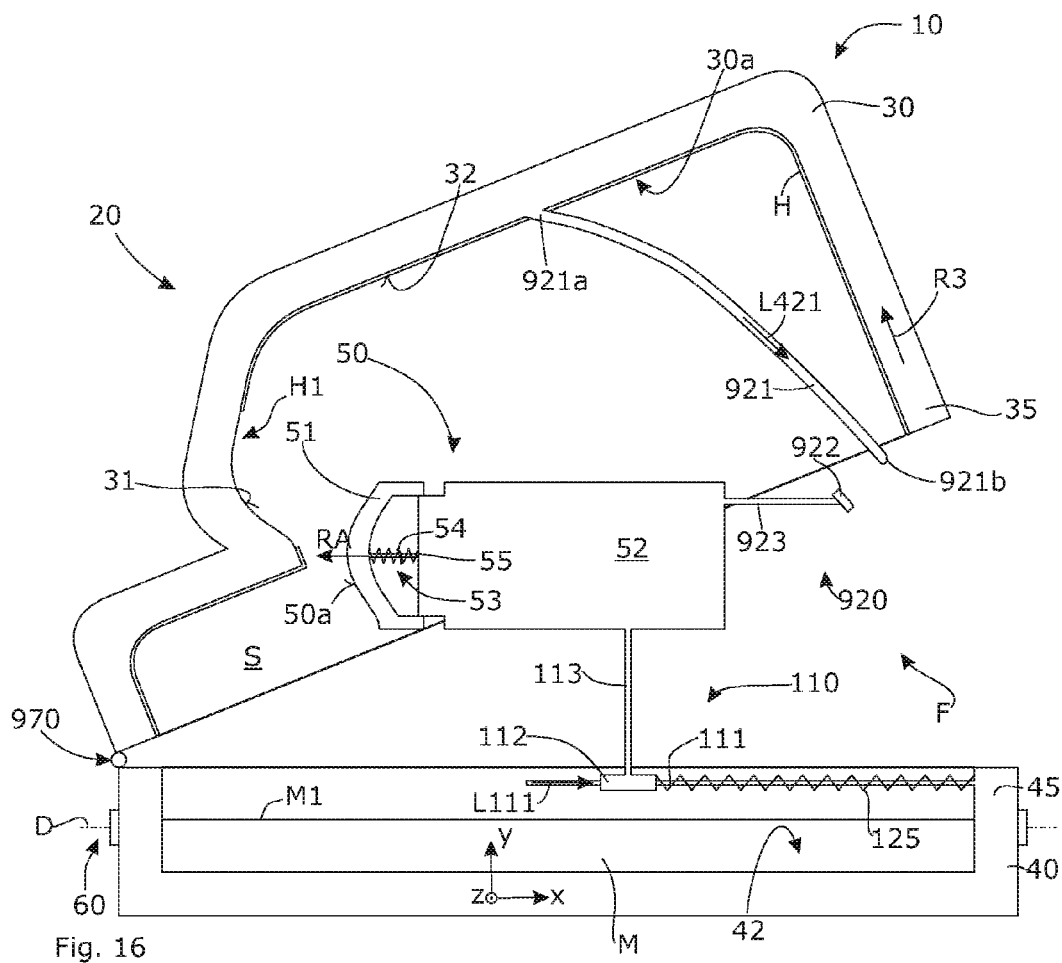

The embodiment presented in FIG. 16 is based on the embodiment of FIG. 1, but can be applied to all of the embodiments described herein. Unlike FIG. 1, opening and closing device 970 is designed as a pivot bearing device, by which the molding part 30 and receptacle 40 are mounted rotatably on adjacent points of border section 35 of molding parts 30 and border section 45 of receptacle 40. The second guide device 920 of guide arrangement F is fixed on or attached to molding part 30. A second coupling element 922 fixed on or attached to covering device 50 via a connecting device 923 for example in the form of a retaining arm is coupled in guiding manner with second guide track 921, so that the second coupling element 122 is movable along second guide track 921. In the embodiment shown, second guide track 921 is attached by a first end 921*a* to molding part 30 and comprises a free end 921*b*, which is positioned at the opposite end to first end 922*a*. The course of the second guide track 921 depends on its position, the position of the covering device 50 and the position of the pivot bearing device 970.

In all embodiments of molding tool 10 according to the invention, the opening and closing device may be realised as a device, that enables an opening and closing movement of molding part 30 relative to receptacle 40 with a translational movement component (in particular according to FIGS. 1 to 6), or which by coupling molding part 30 and receptacle 40 by means of a pivot bearing device 870 enable a rotary opening and closing movement of molding part 30 relative to receptacle 40 (FIG. 7).

The guide tracks of the guide devices provided according to the invention may be in the form of rods.

Figure 17:
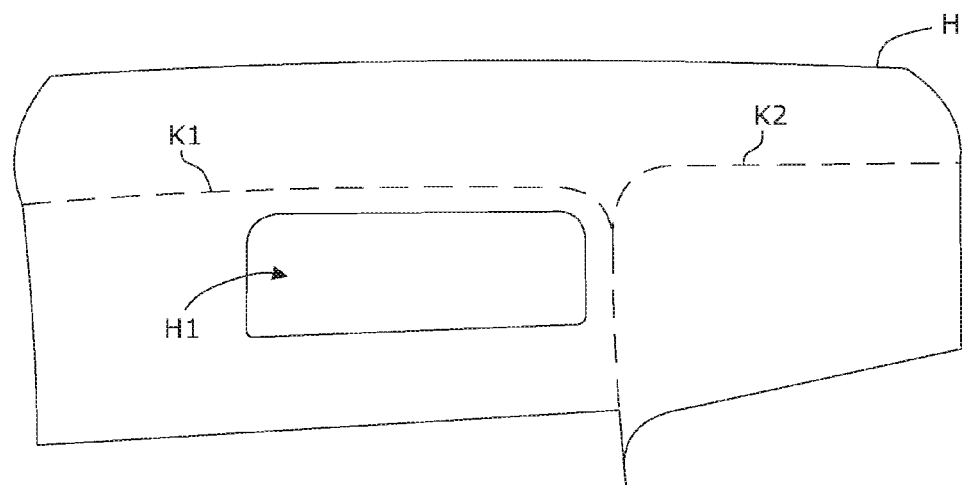

FIG. 17 shows an example of a plastic film component, which is producible with a tooling device 10 according to the invention. Plastic film component H comprises a recess H1. Moreover, contour lines K1, K2 are indicated schematically in the plastic film component H represented.

The invention claimed is:

1. Tooling device for making a plastic film component, the tooling device comprising:
   a molding tool, comprising a molding part with a molding part inner surface, a receptacle and an opening and closing device,
   at least one covering device with a covering surface,
   an abutment device,
   a guide arrangement with a first and a second guide device, wherein the first guide device couples the covering device to one of the components (a) the receptacle or (b) the molding part as a first molding tool component for movement purposes, wherein the second guide device couples the covering device and the abutment device for movement purposes, and
   an activation device that couples the abutment device and the other of the components (a) and (b) as a second molding tool component for movement purposes,
   wherein, when the first and second molding tool components move relative to each other to move the molding tool from an open to a closed position, the abutment device with the second molding tool component are brought to bear on each other in a molding tool bearing position, whereby the abutment device moves in dependence of the movement of the second molding tool component and, by guidance of the first and second guide device, the covering device is moved from an exposed position, in which the covering surface thereof is at a distance from the molding part inner surface of the second molding tool component to a covering position in which the covering surface covers a section of the molding part inner surface.

2. Tooling device according to claim 1, wherein the activation device couples the abutment device to the receptacle, wherein, when the molding tool is in the closed position, the abutment device is in the covered position on the molding part inner surface, wherein the abutment device is fixed on a first guide component, which is coupled for movement purposes with a second guide component fixed to the covering device.

3. Tooling device according to claim 1, wherein the first guide device comprises a first guide component extending flat in a lengthwise direction and the second guide device comprises a second guide component extending flat in a lengthwise direction, which bear on each other during a movement by molding part and receptacle to the closed position thereof, and are guided alongside each other in the respective lengthwise directions thereof, thereby deflecting the movement of molding part and receptacle relative to each other to the closed position into a movement of the covering device into the covered position.

4. Tooling device according to claim 1, wherein the second guide device is constructed according to one of the two following alternatives:
   the second guide device includes: a guide track, which is fixed on the covering device and a second coupling element guided movably thereon, which is fixed on the abutment device,
   the second guide device includes: a guide track, which is fixed on the abutment device, and a second coupling element which is guided movably thereon, which is fixed on the covering device.

5. Tooling device according to claim 4, wherein the connecting device is connected to a third coupling element and wherein the third coupling element is coupled to a third guide track, which is fastened to the receptacle or a support section thereof.

6. Tooling device according to claim 1, wherein second guide device includes:
   a telescoping assembly, which is mounted rotatably on the first molding tool component,
   a first telescoping coupling, with which the telescoping assembly is coupled for movement purposes with the abutment device,
   a second telescoping coupling, with which the telescoping assembly is coupled for movement purposes with the covering device.

7. Tooling device according to claim 1, wherein the tooling device comprises a biasing device, which biases the abutment device into a position, viewed from the receptacle in a direction towards the molding part.

8. Tooling device according to claim 1, wherein the covering device comprises a base body and a covering body movable therein.

9. Tooling device according to claim 1, wherein the molding tool comprises a biasing device, with which the covering device is biased against the base body into the exposed position.

10. Tooling device for making a plastic film component, the tooling device comprising:
    a molding tool, comprising a molding part with a molding part inner surface, a receptacle, and an opening and closing device, with which the molding part and the receptacle are movable relative to each other between a closed and an open position,
    at least one covering device with a covering surface, and
    a guide arrangement having a first guide device, via which the covering device is coupled for movement purposes to one of the components (a) the receptacle or (b) the molding part, and with a second guide device which couples the covering device to the other of the components (a) and (b), wherein due to the guide arrangement the covering device is movable between a covered position, in which the covering surface covers a section to be covered of the molding part inner surface, and an exposed position, in which the covering surface is at a distance from the molding part inner surface, wherein the movement between the covered position and the exposed position is mechanically coupled to the movement of the molding part relative to the receptacle relative to each other into the closed position.

11. Tooling device according to claim 10, wherein the first guide device is designed as a first guide component extending flat in the lengthwise direction and arranged on the covering device and the second guide device is designed as a second guide component extending flat in a lengthwise direction and arranged on the other of the components (a) and (b), wherein with molding part and receptacle in an intermediate bearing position the first guide component and the second guide component are brought to bear on each other and at the approach of molding part and receptacle move towards each other in their lengthwise directions, thereby bringing the covering device from the exposed position into the covered position.

12. Tooling device according to claim 10, wherein the second guide device is constructed according to one of the following alternatives:
   the second guide device includes: a second guide track, which is fixed to the covering device as a second guide component, and a second coupling element guided movably thereon, which is fixed to molding part,
   the second guide device includes: a second guide track, which is fixed to the molding part as a second guide component, and a second coupling element guided movably thereon, which is fixed to the covering device.

13. Tooling device according to claim 10, wherein the second guide device includes: a first guide component and a second guide component, which bear on each other when molding part and receptacle move to their closed position, and are guided along their respective lengthwise directions, and thereby deflect the movement of the molding part and the receptacle relative to each other to the closed position into a movement of the covering device into the covered position.

14. Tooling device according to claim 13, wherein the first guide component comprises a first outer guide surface and the second guide component comprises a second guide surface, which is conformed on a bracket arranged on the molding part and positioned in an interior space, and the first outer guide surface and the second guide surface slide along each other between the intermediate bearing position and the covered position.

15. Tooling device according to claim 13, wherein the first guide component or the second guide component comprises a guide surface and each of the other guide components comprises a roller arrangement, and the guide surface and the roller arrangement slide alongside each other between the intermediate bearing position and the covered position.

16. Tooling device according to claim 10, wherein the first guide device is designed according to one of the following two alternatives:
   the first guide device includes: a first guide track, which is fixed on the receptacle, and a first coupling element fixed on or attached to the covering device, which is coupled for guidance purposes to the first guide track, so that the first coupling element is movable along the first guide track;
   the first guide device includes: a first guide, which is fixed on the covering device, and a first coupling element fixed on or attached to the receptacle, which is coupled for guidance purposes to the first guide track, so that the first coupling element is movable along the first guide track.

17. Tooling device according to claim 10, wherein the covering device comprises a base body and a covering body movable therein.

18. Tooling device according to claim 17, wherein the molding tool comprises a biasing device, with which the covering device is biased against the base body into the exposed position.

19. Tooling device according to claim 10, wherein the opening and closing device:
   is designed as an opening and closing device that enables an opening and closing movement of the molding part relative to the receptacle with a translational movement component, or
   is designed as a pivot bearing device, which enables a rotary opening and closing movement of the molding part relative to the receptacle by coupling the molding parts and the receptacles via a pivot bearing device.

* * * * *